US008284732B2

(12) United States Patent
Nimbalker et al.

(10) Patent No.: US 8,284,732 B2
(45) Date of Patent: Oct. 9, 2012

(54) METHOD AND APPARATUS FOR TRANSPORT BLOCK SIGNALING IN A WIRELESS COMMUNICATION SYSTEM

(75) Inventors: Ajit Nimbalker, Arlington Heights, IL (US); Brian Classon, Palatine, IL (US); Robert Tristan Love, Barrington, IL (US); Vijay Nangia, Algonquin, IL (US)

(73) Assignee: Motorola Mobility LLC, Libertyville, IL (US)

( * ) Notice: Subject to any disclaimer, the term of this patent is extended or adjusted under 35 U.S.C. 154(b) by 527 days.

(21) Appl. No.: 12/365,008

(22) Filed: Feb. 3, 2009

(65) Prior Publication Data

US 2010/0195614 A1    Aug. 5, 2010

(51) Int. Cl.
*H04W 4/00* (2009.01)
(52) U.S. Cl. .................................................... 370/330
(58) Field of Classification Search ................. 370/330; 714/755, 758, 767, 786; 375/298; 455/422.1–522
See application file for complete search history.

(56) References Cited

U.S. PATENT DOCUMENTS

| 2002/0166095 A1* | 11/2002 | Lavi et al. ................. 714/786 |
| 2008/0133998 A1* | 6/2008 | Nimbalker et al. ......... 714/755 |
| 2010/0074195 A1* | 3/2010 | Cheng et al. .............. 370/329 |

OTHER PUBLICATIONS

3rd Generation Partnership Project; Technical Specification Group Radio Access Network; Evolved Universal Terrestrial Radio Access (E-UTRA); Physical layer procedures (Release 8) (May 2008).*
Motorola, Inc., DCI Format 1A Definition for Broadcast Control, Aug. 18-22, 2008, No. R1-083206, Jeju, Korea.
Motorola, Inc., TBS and MCS Signaling and Tables, Mar. 31-Apr. 4, 2008, No. R1-081284, Shenzhen, China.
Motorola, Inc., TBS and MCS Signaling and Tables, Mar. 31-Apr. 4, 2008, No. R1-081638, Shenzhen, China.
Motorola, Inc., TBS and MCS Table Generation and Signaling for E-UTRA, Feb. 10-15, 2008, No. R1-080727, Sorrento, Italy.
Ericsson AB, MCS Table Design—Outcome of Offline Discussions, Feb. 11, 2008, No. R1-081589.
Motorola, Inc., TBS and MCS Table Generation and Signaling for E-UTRA, Jan. 14-18, 2008, No. R1-080072, Seville, Spain.
3 GPP Organizational Partners, 3rd Generation Partnership Project; Technical Specification Group Radio Access Network; Evolved Universal Terrestrial Radio Access (E-UTRA); Physical layer procedures, 2008, Release 8, Version 8.3.0, Valbonne, France.
Motorola; "TBS and MCS Table Generation and Signaling for E-UTRA"; R1-080727 submitted to 3GPP RAN1; Feb. 2008.
Motorola; "TBS and MCS Signaling and Tables"; R1-081284 submitted to 3GPP RAN1; Mar. 2008.
Motorola; "TBS and MCS Signaling and Tables"; R1-081638 submitted to 3GPP RAN1; Apr. 2008.
Ericsson; "MCS Table Design-Outcome of offline discussion" R1-081589 document; Feb. 11, 2008.

* cited by examiner

*Primary Examiner* — Mark Rinehart
*Assistant Examiner* — Mang Yeung
(74) *Attorney, Agent, or Firm* — Roland K. Bowler, II; Christopher J. Reckamp

(57) ABSTRACT

A method and apparatus for generating a single statically defined downlink reference MCS table consisting of transport block sizes (TBSs) computed for 29 MCSs for each of j PRBs where $j=1, \ldots, N_{RB}^{DL}$. Three entries of the MCS table are reserved for implicit modulation order signaling (e.g. in the downlink) or implicit redundancy version signaling (e.g. in the uplink). Each MCS entry in the table is populated by a TBS and the table entries are accessed based on a 5-bit MCS index and resource allocation information, indicating the number of PRBs is signaled via a scheduling message which may be a grant or assignment message. A grant or assignment message may further include a 5-bit MCS field for each transport block which, along with the resource allocation information, enables the UE to determine the scheduled TBS.

21 Claims, 22 Drawing Sheets

900

| Index | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 200 | 232 | 248 |
| 1 | 24 | 48 | 88 | 120 | 160 | 200 | 232 | 272 | 304 | 344 |
| 2 | 32 | 72 | 120 | 160 | 200 | 248 | 296 | 336 | 376 | 424 |
| 3 | 40 | 104 | 152 | 208 | 272 | 320 | 392 | 440 | 504 | 568 |
| 4 | 48 | 120 | 200 | 264 | 320 | 408 | 488 | 552 | 632 | 696 |
| 5 | 72 | 152 | 232 | 320 | 424 | 504 | 600 | 680 | 776 | 872 |
| 6 | 80 | 176 | 288 | 392 | 504 | 600 | 712 | 808 | 936 | 1032 |
| 7 | 104 | 232 | 320 | 472 | 584 | 712 | 840 | 968 | 1096 | 1224 |
| 8 | 120 | 248 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 152 | 320 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 232 | 488 | 744 | 1000 | 1256 | 1544 | 1800 | 2024 | 2280 | 2536 |
| 14 | 264 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 320 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 648 | 1320 | 1992 | 2664 | 3368 | 4008 | 4584 | 5352 | 5992 | 6712 |

} 903

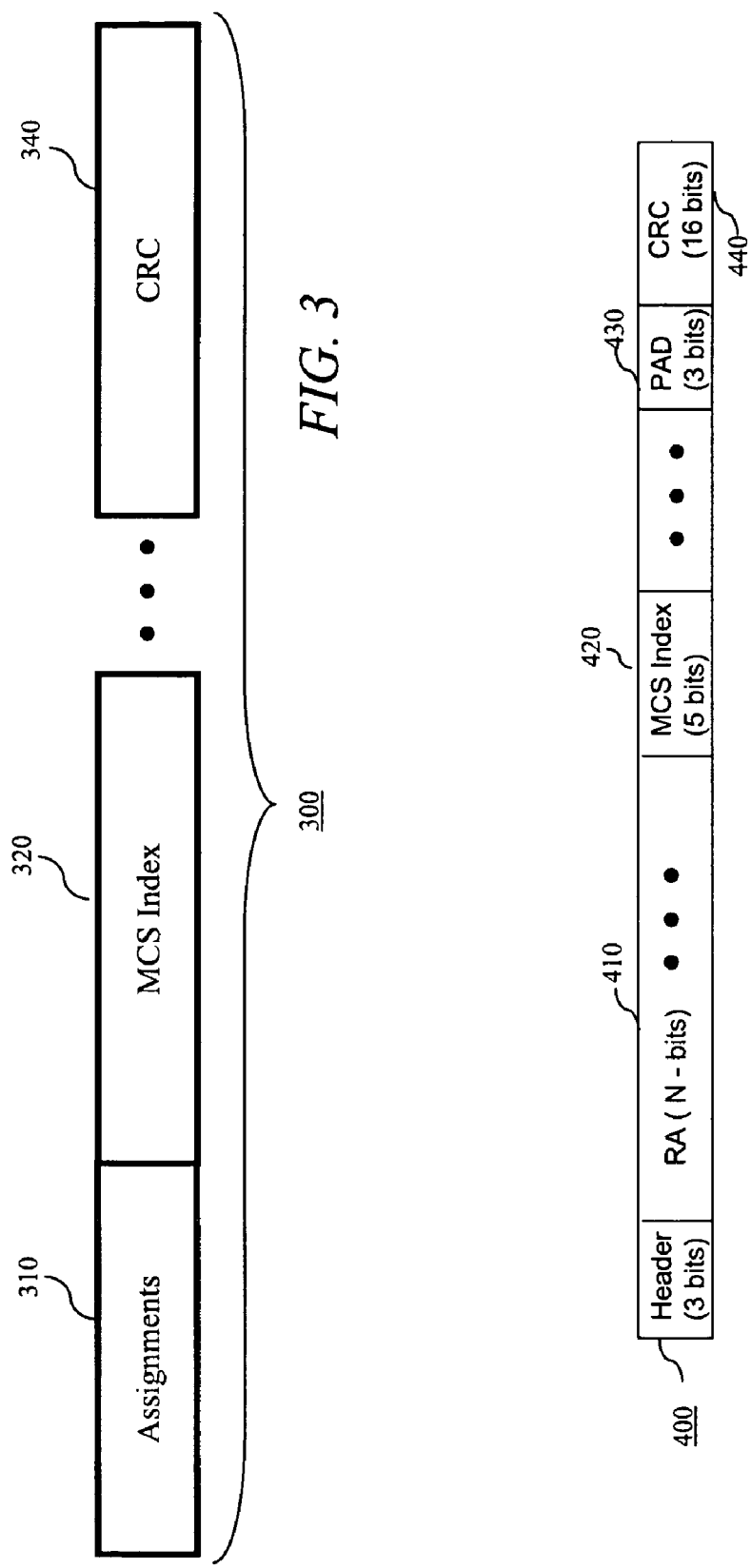

| MCS Index | 1 - PRB | 2 - PRB | 3 - PRB | 4 - PRB |
|---|---|---|---|---|
| '00000' | 16 | 32 | 56 | 88 |
| '00001' | 24 | 48 | 88 | 120 |
| '00010' | 32 | 72 | 120 | 160 |
| '00011' | 40 | 104 | 152 | 208 |

| Index | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 200 | 232 | 248 |
| 1 | 24 | 48 | 88 | 120 | 160 | 200 | 232 | 272 | 304 | 344 |
| 2 | 32 | 72 | 120 | 160 | 200 | 248 | 296 | 336 | 376 | 424 |
| 3 | 40 | 104 | 152 | 208 | 272 | 320 | 392 | 440 | 504 | 568 |
| 4 | 48 | 120 | 200 | 264 | 320 | 408 | 488 | 552 | 632 | 696 |
| 5 | 72 | 152 | 232 | 320 | 424 | 504 | 600 | 680 | 776 | 872 |
| 6 | 80 | 176 | 288 | 392 | 504 | 600 | 712 | 808 | 936 | 1032 |
| 7 | 104 | 232 | 320 | 472 | 584 | 712 | 840 | 968 | 1096 | 1224 |
| 8 | 120 | 248 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 152 | 320 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 232 | 488 | 744 | 1000 | 1256 | 1544 | 1800 | 2024 | 2280 | 2536 |
| 14 | 264 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 320 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 648 | 1320 | 1992 | 2664 | 3368 | 4008 | 4584 | 5352 | 5992 | 6712 |

FIG. 9b    900 (cont'd)

| Index | 11 | 12 | 13 | 14 | 15 | 16 | 17 | 18 | 19 | 20 |
|---|---|---|---|---|---|---|---|---|---|---|
| 0 | 288 | 304 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |
| 3 | 616 | 680 | 744 | 808 | 872 | 904 | 968 | 1032 | 1096 | 1160 |
| 4 | 776 | 840 | 904 | 1000 | 1064 | 1128 | 1192 | 1288 | 1352 | 1416 |
| 5 | 968 | 1032 | 1128 | 1224 | 1320 | 1384 | 1480 | 1544 | 1672 | 1736 |
| 6 | 1128 | 1224 | 1352 | 1480 | 1544 | 1672 | 1736 | 1864 | 1992 | 2088 |
| 7 | 1320 | 1480 | 1608 | 1672 | 1800 | 1928 | 2088 | 2216 | 2344 | 2472 |
| 8 | 1544 | 1672 | 1800 | 1928 | 2088 | 2216 | 2344 | 2536 | 2664 | 2792 |
| 9 | 1736 | 1864 | 2024 | 2216 | 2344 | 2536 | 2664 | 2856 | 2984 | 3112 |
| 10 | 1928 | 2088 | 2280 | 2472 | 2664 | 2792 | 2984 | 3112 | 3368 | 3496 |
| 11 | 2216 | 2408 | 2600 | 2792 | 2984 | 3240 | 3496 | 3624 | 3880 | 4008 |
| 12 | 2472 | 2728 | 2984 | 3240 | 3368 | 3624 | 3880 | 4136 | 4392 | 4584 |
| 13 | 2856 | 3112 | 3368 | 3624 | 3880 | 4136 | 4392 | 4584 | 4968 | 5160 |
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |
| 16 | 3624 | 3880 | 4264 | 4584 | 4968 | 5160 | 5544 | 5992 | 6200 | 6456 |
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| 21 | 5544 | 5992 | 6456 | 6968 | 7480 | 7992 | 8504 | 9144 | 9528 | 9912 |
| 22 | 5992 | 6456 | 6968 | 7480 | 7992 | 8504 | 9144 | 9528 | 10296 | 10680 |
| 23 | 6200 | 6968 | 7480 | 7992 | 8504 | 9144 | 9912 | 10296 | 11064 | 11448 |
| 24 | 6712 | 7224 | 7992 | 8504 | 9144 | 9912 | 10296 | 11064 | 11448 | 12216 |
| 25 | 6968 | 7480 | 8248 | 8760 | 9528 | 10296 | 10680 | 11448 | 12216 | 12576 |
| 26 | 7224 | 7992 | 8504 | 9144 | 9912 | 10680 | 11448 | 11832 | 12576 | 12960 |

$N_{PRB}$

FIG. 9c 900 (cont'd)

| Index | 21 | 22 | 23 | 24 | $N_{PRB}$ 25 | 26 | 27 | 28 | 29 | 30 |
|---|---|---|---|---|---|---|---|---|---|---|
| 0 | 568 | 600 | 616 | 648 | 680 | 712 | 744 | 776 | 776 | 808 |
| 1 | 744 | 776 | 808 | 872 | 904 | 936 | 968 | 1000 | 1032 | 1064 |
| 2 | 936 | 968 | 1000 | 1064 | 1096 | 1160 | 1192 | 1256 | 1288 | 1320 |
| 3 | 1224 | 1256 | 1320 | 1384 | 1416 | 1480 | 1544 | 1608 | 1672 | 1736 |
| 4 | 1480 | 1544 | 1608 | 1736 | 1800 | 1864 | 1928 | 1992 | 2088 | 2152 |
| 5 | 1864 | 1928 | 2024 | 2088 | 2216 | 2280 | 2344 | 2472 | 2536 | 2664 |
| 6 | 2216 | 2280 | 2408 | 2472 | 2600 | 2728 | 2792 | 2984 | 2984 | 3112 |
| 7 | 2536 | 2664 | 2792 | 2984 | 3112 | 3240 | 3368 | 3368 | 3496 | 3624 |
| 8 | 2984 | 3112 | 3240 | 3368 | 3496 | 3624 | 3752 | 3880 | 4008 | 4264 |
| 9 | 3368 | 3496 | 3624 | 3752 | 4008 | 4136 | 4264 | 4392 | 4584 | 4776 |
| 10 | 3752 | 3880 | 4008 | 4264 | 4392 | 4584 | 4776 | 4968 | 5160 | 5352 |
| 11 | 4264 | 4392 | 4584 | 4776 | 4968 | 5352 | 5544 | 5736 | 5992 | 5992 |
| 12 | 4776 | 4968 | 5352 | 5544 | 5736 | 5992 | 6200 | 6456 | 6712 | 6712 |
| 13 | 5352 | 5736 | 5992 | 6200 | 6456 | 6712 | 6968 | 7224 | 7480 | 7736 |
| 14 | 5992 | 6200 | 6456 | 6968 | 7224 | 7480 | 7736 | 7992 | 7736 | 7736 |
| 15 | 6456 | 6712 | 6968 | 7224 | 7736 | 7992 | 8248 | 8504 | 8248 | 8504 |
| 16 | 6712 | 7224 | 7480 | 7736 | 7992 | 8504 | 8760 | 9144 | 8760 | 9144 |
| 17 | 7480 | 7992 | 8248 | 8760 | 9144 | 9528 | 9912 | 10296 | 9528 | 9912 |
| 18 | 8248 | 8760 | 9144 | 9528 | 9912 | 10296 | 10680 | 11064 | 10296 | 10680 |
| 19 | 9144 | 9528 | 9912 | 10296 | 10680 | 11064 | 11448 | 11832 | 11448 | 11832 |
| 20 | 9912 | 10296 | 10680 | 11064 | 11448 | 12216 | 12576 | 12960 | 12576 | 12960 |
| 21 | 10680 | 11064 | 11448 | 12216 | 12576 | 12960 | 13536 | 14112 | 13536 | 14112 |
| 22 | 11448 | 11832 | 12576 | 12960 | 13536 | 14112 | 14688 | 15264 | 14688 | 15264 |
| 23 | 12216 | 12576 | 12960 | 13536 | 14112 | 14688 | 15264 | 15840 | 15840 | 16416 |
| 24 | 12960 | 13536 | 14112 | 14688 | 15264 | 15840 | 16416 | 16992 | 16416 | 16992 |
| 25 | 13536 | 14112 | 14688 | 15264 | 15840 | 16416 | 16992 | 17568 | 17568 | 18336 |
| 26 | 14112 | 14688 | 15264 | 15840 | 16416 | 16992 | 17568 | 18336 | 18336 | 19080 |
| | | | | | | | | | 19080 | 19848 |

| Index | $N_{PRB}$ | | | | | | | | | |
|---|---|---|---|---|---|---|---|---|---|---|
| | 31 | 32 | 33 | 34 | 35 | 36 | 37 | 38 | 39 | 40 |
| 0 | 840 | 872 | 904 | 936 | 968 | 1000 | 1032 | 1032 | 1064 | 1096 |
| 1 | 1128 | 1160 | 1192 | 1224 | 1256 | 1288 | 1352 | 1384 | 1416 | 1416 |
| 2 | 1384 | 1416 | 1480 | 1544 | 1544 | 1608 | 1672 | 1672 | 1736 | 1800 |
| 3 | 1800 | 1864 | 1928 | 1992 | 2024 | 2088 | 2152 | 2216 | 2280 | 2344 |
| 4 | 2216 | 2280 | 2344 | 2408 | 2472 | 2600 | 2664 | 2728 | 2792 | 2856 |
| 5 | 2728 | 2792 | 2856 | 2984 | 3112 | 3112 | 3240 | 3368 | 3496 | 3496 |
| 6 | 3240 | 3368 | 3496 | 3496 | 3624 | 3752 | 3880 | 4008 | 4136 | 4136 |
| 7 | 3752 | 3880 | 4008 | 4136 | 4264 | 4392 | 4584 | 4584 | 4776 | 4968 |
| 8 | 4392 | 4584 | 4584 | 4776 | 4968 | 4968 | 5160 | 5352 | 5544 | 5544 |
| 9 | 4968 | 5160 | 5160 | 5352 | 5544 | 5736 | 5736 | 5992 | 6200 | 6200 |
| 10 | 5544 | 5736 | 5736 | 5992 | 6200 | 6200 | 6456 | 6712 | 6712 | 6968 |
| 11 | 6200 | 6456 | 6712 | 6968 | 6968 | 7224 | 7480 | 7736 | 7736 | 7992 |
| 12 | 6968 | 7224 | 7480 | 7736 | 7992 | 8248 | 8504 | 8760 | 8760 | 9144 |
| 13 | 7992 | 8248 | 8504 | 8760 | 9144 | 9144 | 9528 | 9912 | 9912 | 10296 |
| 14 | 8760 | 9144 | 9528 | 9912 | 9912 | 10296 | 10680 | 11064 | 11064 | 11448 |
| 15 | 9528 | 9912 | 10680 | 10296 | 10680 | 11064 | 11448 | 11832 | 11832 | 12216 |
| 16 | 9912 | 10296 | 10680 | 11064 | 11448 | 11832 | 12216 | 12216 | 12576 | 12960 |
| 17 | 11064 | 11448 | 11832 | 12216 | 12576 | 12960 | 13536 | 13536 | 14112 | 14688 |
| 18 | 12216 | 12576 | 12960 | 13536 | 14112 | 14112 | 14688 | 15264 | 15264 | 15840 |
| 19 | 13536 | 13536 | 14112 | 14688 | 15264 | 15264 | 15840 | 16416 | 16992 | 16992 |
| 20 | 14688 | 14688 | 15264 | 15840 | 16416 | 16992 | 16992 | 17568 | 18336 | 18336 |
| 21 | 15840 | 15840 | 16416 | 16992 | 17568 | 18336 | 18336 | 19080 | 19848 | 19848 |
| 22 | 16992 | 16992 | 17568 | 18336 | 19080 | 19080 | 19848 | 20616 | 21384 | 21384 |
| 23 | 17568 | 18336 | 19080 | 19848 | 19848 | 20616 | 21384 | 22152 | 22152 | 22920 |
| 24 | 19080 | 19848 | 19848 | 20616 | 21384 | 22152 | 22920 | 22920 | 23688 | 24496 |
| 25 | 19848 | 20616 | 20616 | 21384 | 22152 | 22920 | 23688 | 24496 | 24496 | 25456 |
| 26 | 20616 | 21384 | 22152 | 22920 | 22920 | 23688 | 24496 | 25456 | 25456 | 26416 |

FIG. 9e 900 (cont'd)

| Index | $N_{PRB}$ | | | | | | | | | |
|---|---|---|---|---|---|---|---|---|---|---|
| | 41 | 42 | 43 | 44 | 45 | 46 | 47 | 48 | 49 | 50 |
| 0 | 1128 | 1160 | 1192 | 1224 | 1256 | 1256 | 1288 | 1320 | 1352 | 1384 |
| 1 | 1480 | 1544 | 1544 | 1608 | 1608 | 1672 | 1736 | 1736 | 1800 | 1800 |
| 2 | 1800 | 1864 | 1928 | 1992 | 2024 | 2088 | 2088 | 2152 | 2216 | 2216 |
| 3 | 2408 | 2472 | 2536 | 2536 | 2600 | 2664 | 2728 | 2792 | 2856 | 2856 |
| 4 | 2984 | 2984 | 3112 | 3112 | 3240 | 3240 | 3368 | 3496 | 3496 | 3624 |
| 5 | 3624 | 3752 | 3752 | 3880 | 4008 | 4008 | 4136 | 4264 | 4392 | 4392 |
| 6 | 4264 | 4392 | 4584 | 4584 | 4776 | 4776 | 4968 | 4968 | 5160 | 5160 |
| 7 | 4968 | 5160 | 5352 | 5352 | 5544 | 5736 | 5736 | 5992 | 5992 | 6200 |
| 8 | 5736 | 5992 | 5992 | 6200 | 6200 | 6456 | 6456 | 6712 | 6968 | 6968 |
| 9 | 6456 | 6712 | 6712 | 6968 | 6968 | 7224 | 7480 | 7480 | 7736 | 7992 |
| 10 | 7224 | 7480 | 7480 | 7736 | 7992 | 7992 | 8248 | 8504 | 8504 | 8760 |
| 11 | 8248 | 8504 | 8760 | 8760 | 9144 | 9144 | 9528 | 9528 | 9912 | 9912 |
| 12 | 9528 | 9528 | 9912 | 9912 | 10296 | 10680 | 10680 | 11064 | 11064 | 11448 |
| 13 | 10680 | 10680 | 11064 | 11448 | 11448 | 11832 | 12216 | 12216 | 12576 | 12960 |
| 14 | 11832 | 12216 | 12216 | 12576 | 12960 | 12960 | 13536 | 13536 | 14112 | 14112 |
| 15 | 12576 | 12960 | 12960 | 13536 | 13536 | 14112 | 14688 | 14688 | 15264 | 15264 |
| 16 | 13536 | 13536 | 14112 | 14112 | 14688 | 14688 | 15264 | 15840 | 15840 | 16416 |
| 17 | 14688 | 15264 | 15264 | 15840 | 16416 | 16416 | 16992 | 17568 | 17568 | 18336 |
| 18 | 16416 | 16416 | 16992 | 17568 | 17568 | 18336 | 18336 | 19080 | 19080 | 19848 |
| 19 | 17568 | 18336 | 18336 | 19080 | 19080 | 19848 | 20616 | 20616 | 21384 | 21384 |
| 20 | 19080 | 19848 | 19848 | 20616 | 20616 | 21384 | 20616 | 22152 | 22920 | 22920 |
| 21 | 20616 | 21384 | 21384 | 22152 | 22920 | 22920 | 23688 | 24496 | 24496 | 25456 |
| 22 | 22152 | 22920 | 22920 | 23688 | 24496 | 24496 | 25456 | 25456 | 26416 | 27376 |
| 23 | 23688 | 24496 | 24496 | 25456 | 25456 | 26416 | 27376 | 27376 | 28336 | 28336 |
| 24 | 25456 | 25456 | 26416 | 26416 | 27376 | 28336 | 28336 | 29296 | 29296 | 30576 |
| 25 | 26416 | 26416 | 27376 | 28336 | 28336 | 29296 | 29296 | 30576 | 31704 | 31704 |
| 26 | 27376 | 27376 | 28336 | 29296 | 29296 | 30576 | 31704 | 31704 | 32856 | 32856 |

FIG. 9f 900 (cont'd)

| Index | \(N_{PRB}\) | | | | | | | | | |
|---|---|---|---|---|---|---|---|---|---|---|
| | 51 | 52 | 53 | 54 | 55 | 56 | 57 | 58 | 59 | 60 |
| 0 | 1416 | 1416 | 1480 | 1480 | 1544 | 1544 | 1608 | 1608 | 1608 | 1672 |
| 1 | 1864 | 1864 | 1928 | 1992 | 1992 | 2024 | 2088 | 2088 | 2152 | 2152 |
| 2 | 2280 | 2344 | 2344 | 2408 | 2472 | 2536 | 2536 | 2600 | 2664 | 2664 |
| 3 | 2984 | 2984 | 3112 | 3112 | 3240 | 3240 | 3368 | 3368 | 3496 | 3496 |
| 4 | 3624 | 3752 | 3752 | 3880 | 4008 | 4008 | 4136 | 4136 | 4264 | 4264 |
| 5 | 4584 | 4584 | 4776 | 4776 | 4776 | 4968 | 4968 | 5160 | 5160 | 5352 |
| 6 | 5352 | 5352 | 5544 | 5736 | 5736 | 5992 | 5992 | 5992 | 6200 | 6200 |
| 7 | 6200 | 6456 | 6456 | 6712 | 6712 | 6712 | 6968 | 6968 | 7224 | 7224 |
| 8 | 7224 | 7224 | 7480 | 7480 | 7736 | 7736 | 7992 | 7992 | 8248 | 8504 |
| 9 | 7992 | 8248 | 8248 | 8504 | 8760 | 8760 | 9144 | 9144 | 9144 | 9528 |
| 10 | 9144 | 9144 | 9144 | 9528 | 9528 | 9912 | 9912 | 10296 | 10296 | 10680 |
| 11 | 10296 | 10680 | 10680 | 11064 | 11064 | 11448 | 11448 | 11832 | 11832 | 12216 |
| 12 | 11832 | 11832 | 12216 | 12216 | 12576 | 12576 | 12960 | 12960 | 13536 | 13536 |
| 13 | 12960 | 13536 | 13536 | 14112 | 14112 | 14688 | 14688 | 14688 | 15264 | 15264 |
| 14 | 14688 | 14688 | 15264 | 15264 | 15840 | 15840 | 16416 | 16416 | 16992 | 16992 |
| 15 | 15840 | 15840 | 16416 | 16416 | 16992 | 16992 | 17568 | 17568 | 18336 | 18336 |
| 16 | 16416 | 16992 | 16992 | 17568 | 17568 | 18336 | 18336 | 19080 | 19080 | 19848 |
| 17 | 18336 | 19080 | 19080 | 19848 | 19848 | 20616 | 20616 | 20616 | 21384 | 21384 |
| 18 | 19848 | 20616 | 21384 | 21384 | 22152 | 22152 | 22920 | 22920 | 23688 | 23688 |
| 19 | 22152 | 22152 | 22920 | 22920 | 23688 | 24496 | 24496 | 25456 | 25456 | 25456 |
| 20 | 23688 | 24496 | 24496 | 25456 | 25456 | 26416 | 26416 | 27376 | 27376 | 28336 |
| 21 | 25456 | 26416 | 26416 | 27376 | 27376 | 28336 | 28336 | 29296 | 29296 | 30576 |
| 22 | 27376 | 28336 | 28336 | 29296 | 29296 | 30576 | 30576 | 31704 | 31704 | 32856 |
| 23 | 29296 | 29296 | 30576 | 30576 | 31704 | 31704 | 32856 | 32856 | 34008 | 34008 |
| 24 | 31704 | 31704 | 32856 | 32856 | 34008 | 34008 | 35160 | 35160 | 36696 | 36696 |
| 25 | 32856 | 32856 | 34008 | 34008 | 35160 | 35160 | 36696 | 36696 | 37888 | 37888 |
| 26 | 34008 | 34008 | 35160 | 35160 | 36696 | 36696 | 37888 | 37888 | 39232 | 39232 |

| Index | $N_{PRB}$ | | | | | | | | | |
|---|---|---|---|---|---|---|---|---|---|---|
| | 61 | 62 | 63 | 64 | 65 | 66 | 67 | 68 | 69 | 70 |
| 0 | 1672 | 1736 | 1736 | 1800 | 1800 | 1800 | 1864 | 1864 | 1928 | 1928 |
| 1 | 2216 | 2280 | 2280 | 2344 | 2344 | 2408 | 2472 | 2472 | 2536 | 2536 |
| 2 | 2728 | 2792 | 2856 | 2856 | 2856 | 2984 | 2984 | 3112 | 3112 | 3112 |
| 3 | 3624 | 3624 | 3624 | 3752 | 3752 | 3880 | 3880 | 4008 | 4008 | 4136 |
| 4 | 4392 | 4392 | 4584 | 4584 | 4584 | 4776 | 4776 | 4968 | 4968 | 4968 |
| 5 | 5352 | 5544 | 5544 | 5736 | 5736 | 5736 | 5992 | 5992 | 5992 | 6200 |
| 6 | 6456 | 6456 | 6456 | 6712 | 6712 | 6968 | 6968 | 6968 | 7224 | 7224 |
| 7 | 7480 | 7480 | 7736 | 7736 | 7992 | 7992 | 8248 | 8248 | 8504 | 8504 |
| 8 | 8504 | 8760 | 8760 | 9144 | 9144 | 9144 | 9528 | 9528 | 9528 | 9912 |
| 9 | 9528 | 9912 | 9912 | 10296 | 10296 | 10296 | 10680 | 10680 | 11064 | 11064 |
| 10 | 10680 | 11064 | 11064 | 11448 | 11448 | 11448 | 11832 | 11832 | 12216 | 12216 |
| 11 | 12216 | 12576 | 12576 | 12960 | 12960 | 13536 | 13536 | 13536 | 14112 | 14112 |
| 12 | 14112 | 14112 | 14112 | 14688 | 14688 | 15264 | 15264 | 15264 | 15840 | 15840 |
| 13 | 15840 | 15840 | 16416 | 16416 | 16992 | 16992 | 16992 | 17568 | 17568 | 18336 |
| 14 | 17568 | 17568 | 18336 | 18336 | 18336 | 19080 | 19080 | 19848 | 19848 | 19848 |
| 15 | 18336 | 19080 | 19080 | 19848 | 19848 | 20616 | 20616 | 20616 | 21384 | 21384 |
| 16 | 19848 | 19848 | 20616 | 20616 | 21384 | 21384 | 22152 | 22152 | 22152 | 22920 |
| 17 | 22152 | 22152 | 22920 | 22920 | 23688 | 23688 | 24496 | 24496 | 24496 | 25456 |
| 18 | 24496 | 24496 | 24496 | 25456 | 25456 | 26416 | 26416 | 27376 | 27376 | 27376 |
| 19 | 26416 | 26416 | 27376 | 27376 | 28336 | 28336 | 29296 | 29296 | 29296 | 30576 |
| 20 | 28336 | 29296 | 29296 | 29296 | 30576 | 30576 | 31704 | 31704 | 31704 | 32856 |
| 21 | 30576 | 31704 | 31704 | 31704 | 32856 | 32856 | 34008 | 34008 | 35160 | 35160 |
| 22 | 32856 | 34008 | 34008 | 34008 | 35160 | 35160 | 36696 | 36696 | 36696 | 37888 |
| 23 | 35160 | 35160 | 36696 | 36696 | 37888 | 37888 | 37888 | 39232 | 39232 | 40576 |
| 24 | 36696 | 37888 | 37888 | 39232 | 39232 | 40576 | 40576 | 42368 | 42368 | 42368 |
| 25 | 39232 | 39232 | 40576 | 40576 | 40576 | 42368 | 42368 | 43816 | 43816 | 43816 |
| 26 | 40576 | 40576 | 42368 | 42368 | 43816 | 43816 | 43816 | 45352 | 45352 | 46888 |

FIG. 9h 900 (cont'd)

| Index | $N_{PRB}$ | | | | | | | | | |
|---|---|---|---|---|---|---|---|---|---|---|
| | 71 | 72 | 73 | 74 | 75 | 76 | 77 | 78 | 79 | 80 |
| 0 | 1992 | 1992 | 2024 | 2088 | 2088 | 2088 | 2152 | 2152 | 2216 | 2216 |
| 1 | 2600 | 2600 | 2664 | 2728 | 2728 | 2792 | 2792 | 2856 | 2856 | 2856 |
| 2 | 3240 | 3240 | 3240 | 3368 | 3368 | 3368 | 3496 | 3496 | 3496 | 3624 |
| 3 | 4136 | 4264 | 4264 | 4392 | 4392 | 4392 | 4584 | 4584 | 4584 | 4776 |
| 4 | 5160 | 5160 | 5160 | 5352 | 5352 | 5544 | 5544 | 5544 | 5736 | 5736 |
| 5 | 6200 | 6200 | 6456 | 6456 | 6712 | 6712 | 6712 | 6968 | 6968 | 6968 |
| 6 | 7480 | 7480 | 7736 | 7736 | 7736 | 7992 | 7992 | 8248 | 8248 | 8248 |
| 7 | 8760 | 8760 | 8760 | 9144 | 9144 | 9144 | 9528 | 9528 | 9528 | 9912 |
| 8 | 9912 | 9912 | 10296 | 10296 | 10680 | 10680 | 10680 | 11064 | 11064 | 11064 |
| 9 | 11064 | 11448 | 11448 | 11832 | 11832 | 11832 | 12216 | 12216 | 12576 | 12576 |
| 10 | 12576 | 12576 | 12960 | 12960 | 12960 | 13536 | 13536 | 13536 | 14112 | 14112 |
| 11 | 14112 | 14688 | 14688 | 14688 | 15264 | 15264 | 15840 | 15840 | 15840 | 16416 |
| 12 | 16416 | 16416 | 16416 | 16992 | 16992 | 17568 | 17568 | 17568 | 18336 | 18336 |
| 13 | 18336 | 18336 | 19080 | 19080 | 19080 | 19848 | 19848 | 19848 | 20616 | 20616 |
| 14 | 20616 | 20616 | 20616 | 21384 | 21384 | 22152 | 22152 | 22152 | 22920 | 22920 |
| 15 | 22152 | 22152 | 22152 | 22920 | 22920 | 23688 | 23688 | 23688 | 24496 | 24496 |
| 16 | 22920 | 23688 | 23688 | 24496 | 24496 | 24496 | 25456 | 25456 | 25456 | 26416 |
| 17 | 25456 | 26416 | 26416 | 26416 | 27376 | 27376 | 27376 | 28336 | 28336 | 29296 |
| 18 | 28336 | 28336 | 29296 | 29296 | 29296 | 30576 | 30576 | 30576 | 31704 | 31704 |
| 19 | 30576 | 30576 | 31704 | 31704 | 32856 | 32856 | 32856 | 34008 | 34008 | 34008 |
| 20 | 32856 | 34008 | 34008 | 34008 | 35160 | 35160 | 35160 | 36696 | 36696 | 36696 |
| 21 | 35160 | 36696 | 36696 | 36696 | 37888 | 37888 | 39232 | 39232 | 39232 | 40576 |
| 22 | 37888 | 39232 | 39232 | 40576 | 40576 | 40576 | 42368 | 42368 | 42368 | 43816 |
| 23 | 40576 | 40576 | 42368 | 42368 | 43816 | 43816 | 43816 | 45352 | 45352 | 45352 |
| 24 | 43816 | 43816 | 45352 | 45352 | 45352 | 46888 | 46888 | 46888 | 48936 | 48936 |
| 25 | 45352 | 45352 | 46888 | 46888 | 46888 | 48936 | 48936 | 48936 | 51024 | 51024 |
| 26 | 46888 | 46888 | 48936 | 48936 | 48936 | 51024 | 51024 | 51024 | 52752 | 52752 |

| Index | \$N_{PRB}\$ | | | | | | | | | |
|---|---|---|---|---|---|---|---|---|---|---|
| | 81 | 82 | 83 | 84 | 85 | 86 | 87 | 88 | 89 | 90 |
| 0 | 2280 | 2280 | 2280 | 2344 | 2344 | 2408 | 2408 | 2472 | 2472 | 2536 |
| 1 | 2984 | 2984 | 2984 | 3112 | 3112 | 3112 | 3240 | 3240 | 3240 | 3240 |
| 2 | 3624 | 3624 | 3752 | 3752 | 3880 | 3880 | 3880 | 4008 | 4008 | 4008 |
| 3 | 4776 | 4776 | 4776 | 4968 | 4968 | 4968 | 5160 | 5160 | 5160 | 5352 |
| 4 | 5736 | 5992 | 5992 | 5992 | 5992 | 6200 | 6200 | 6200 | 6456 | 6456 |
| 5 | 7224 | 7224 | 7224 | 7480 | 7480 | 7480 | 7736 | 7736 | 7736 | 7992 |
| 6 | 8504 | 8504 | 8760 | 8760 | 8760 | 9144 | 9144 | 9144 | 9144 | 9528 |
| 7 | 9912 | 9912 | 10296 | 10296 | 10296 | 10680 | 10680 | 10680 | 11064 | 11064 |
| 8 | 11448 | 11448 | 11448 | 11832 | 11832 | 12216 | 12216 | 12216 | 12576 | 12576 |
| 9 | 12960 | 12960 | 12960 | 13536 | 13536 | 13536 | 13536 | 14112 | 14112 | 14112 |
| 10 | 14112 | 14688 | 14688 | 14688 | 14688 | 15264 | 15264 | 15264 | 15840 | 15840 |
| 11 | 16416 | 16416 | 16992 | 16992 | 16992 | 17568 | 17568 | 17568 | 18336 | 18336 |
| 12 | 18336 | 19080 | 19080 | 19080 | 19080 | 19848 | 19848 | 19848 | 20616 | 20616 |
| 13 | 20616 | 21384 | 21384 | 21384 | 22152 | 22152 | 22152 | 22920 | 22920 | 22920 |
| 14 | 22920 | 23688 | 23688 | 24496 | 24496 | 24496 | 25456 | 25456 | 25456 | 25456 |
| 15 | 24496 | 25456 | 25456 | 25456 | 26416 | 26416 | 26416 | 27376 | 27376 | 27376 |
| 16 | 26416 | 26416 | 27376 | 27376 | 27376 | 28336 | 28336 | 28336 | 29296 | 29296 |
| 17 | 29296 | 29296 | 30576 | 30576 | 30576 | 30576 | 31704 | 31704 | 31704 | 32856 |
| 18 | 31704 | 32856 | 32856 | 32856 | 34008 | 34008 | 34008 | 35160 | 35160 | 35160 |
| 19 | 35160 | 35160 | 35160 | 36696 | 36696 | 36696 | 37888 | 37888 | 37888 | 39232 |
| 20 | 37888 | 37888 | 39232 | 39232 | 39232 | 40576 | 37888 | 40576 | 42368 | 42368 |
| 21 | 40576 | 40576 | 42368 | 42368 | 42368 | 43816 | 43816 | 43816 | 45352 | 45352 |
| 22 | 43816 | 43816 | 45352 | 45352 | 45352 | 46888 | 46888 | 46888 | 48936 | 48936 |
| 23 | 46888 | 46888 | 46888 | 48936 | 48936 | 48936 | 51024 | 51024 | 51024 | 51024 |
| 24 | 48936 | 51024 | 51024 | 51024 | 52752 | 52752 | 52752 | 52752 | 55056 | 55056 |
| 25 | 51024 | 52752 | 52752 | 52752 | 55056 | 55056 | 55056 | 55056 | 57336 | 57336 |
| 26 | 52752 | 55056 | 55056 | 55056 | 57336 | 57336 | 57336 | 59256 | 59256 | 59256 |

FIG. 9j 900 (cont'd)

| Index | $N_{PRB}$ | | | | | | | | | |
|---|---|---|---|---|---|---|---|---|---|---|
| | 91 | 92 | 93 | 94 | 95 | 96 | 97 | 98 | 99 | 100 |
| 0 | 2536 | 2536 | 2600 | 2600 | 2664 | 2664 | 2728 | 2728 | 2728 | 2792 |
| 1 | 3368 | 3368 | 3368 | 3496 | 3496 | 3496 | 3496 | 3624 | 3624 | 3624 |
| 2 | 4136 | 4136 | 4136 | 4264 | 4264 | 4264 | 4392 | 4392 | 4392 | 4584 |
| 3 | 5352 | 5352 | 5352 | 5544 | 5544 | 5544 | 5736 | 5736 | 5736 | 5736 |
| 4 | 6456 | 6456 | 6712 | 6712 | 6712 | 6968 | 6968 | 6968 | 6968 | 7224 |
| 5 | 7992 | 7992 | 8248 | 8248 | 8248 | 8504 | 8504 | 8760 | 8760 | 8760 |
| 6 | 9528 | 9528 | 9528 | 9912 | 9912 | 9912 | 10296 | 10296 | 10296 | 10296 |
| 7 | 11064 | 11448 | 11448 | 11448 | 11448 | 11832 | 11832 | 11832 | 12216 | 12216 |
| 8 | 12576 | 12960 | 12960 | 12960 | 13536 | 13536 | 13536 | 13536 | 14112 | 14112 |
| 9 | 14112 | 14688 | 14688 | 14688 | 15264 | 15264 | 15264 | 15264 | 15840 | 15840 |
| 10 | 15840 | 16416 | 16416 | 16416 | 16992 | 16992 | 16992 | 16992 | 17568 | 17568 |
| 11 | 18336 | 18336 | 19080 | 19080 | 19080 | 19080 | 19848 | 19848 | 19848 | 19848 |
| 12 | 20616 | 21384 | 21384 | 21384 | 21384 | 22152 | 22152 | 22152 | 22920 | 22920 |
| 13 | 23688 | 23688 | 23688 | 24496 | 24496 | 24496 | 25456 | 25456 | 25456 | 25456 |
| 14 | 26416 | 26416 | 26416 | 27376 | 27376 | 27376 | 28336 | 28336 | 28336 | 28336 |
| 15 | 28336 | 28336 | 28336 | 29296 | 29296 | 29296 | 29296 | 30576 | 30576 | 30576 |
| 16 | 29296 | 30576 | 30576 | 30576 | 30576 | 31704 | 31704 | 31704 | 31704 | 32856 |
| 17 | 32856 | 32856 | 34008 | 34008 | 34008 | 35160 | 35160 | 35160 | 35160 | 36696 |
| 18 | 36696 | 36696 | 36696 | 37888 | 37888 | 37888 | 37888 | 39232 | 39232 | 39232 |
| 19 | 39232 | 39232 | 40576 | 40576 | 40576 | 40576 | 42368 | 42368 | 42368 | 43816 |
| 20 | 42368 | 42368 | 43816 | 43816 | 43816 | 45352 | 45352 | 45352 | 46888 | 46888 |
| 21 | 45352 | 46888 | 46888 | 46888 | 46888 | 48936 | 48936 | 48936 | 48936 | 51024 |
| 22 | 48936 | 48936 | 51024 | 51024 | 51024 | 51024 | 52752 | 52752 | 52752 | 55056 |
| 23 | 52752 | 52752 | 52752 | 55056 | 55056 | 55056 | 55056 | 57336 | 57336 | 57336 |
| 24 | 55056 | 57336 | 57336 | 57336 | 57336 | 59256 | 59256 | 59256 | 61664 | 61664 |
| 25 | 57336 | 59256 | 59256 | 59256 | 61664 | 61664 | 61664 | 61664 | 63776 | 63776 |
| 26 | 59256 | 61664 | 61664 | 61664 | 63776 | 63776 | 63776 | 63776 | 66592 | 75376 |

FIG. 9k    900 (cont'd)

| Index | \multicolumn{10}{c}{$N_{PRB}$} | | | | | | | | | |
|---|---|---|---|---|---|---|---|---|---|---|
| | 101 | 102 | 103 | 104 | 105 | 106 | 107 | 108 | 109 | 110 |
| 0 | 2792 | 2856 | 2856 | 2856 | 2984 | 2984 | 2984 | 2984 | 2984 | 3112 |
| 1 | 3752 | 3752 | 3752 | 3752 | 3880 | 3880 | 3880 | 4008 | 4008 | 4008 |
| 2 | 4584 | 4584 | 4584 | 4584 | 4776 | 4776 | 4776 | 4776 | 4968 | 4968 |
| 3 | 5992 | 5992 | 5992 | 5992 | 6200 | 6200 | 6200 | 6200 | 6456 | 6456 |
| 4 | 7224 | 7224 | 7480 | 7480 | 7480 | 7480 | 7736 | 7736 | 7736 | 7992 |
| 5 | 8760 | 9144 | 9144 | 9144 | 9144 | 9528 | 9528 | 9528 | 9528 | 9528 |
| 6 | 10680 | 10680 | 10680 | 10680 | 11064 | 11064 | 11064 | 11448 | 11448 | 11448 |
| 7 | 12216 | 12576 | 12576 | 12576 | 12960 | 12960 | 12960 | 12960 | 13536 | 13536 |
| 8 | 14112 | 14112 | 14688 | 14688 | 14688 | 14688 | 15264 | 15264 | 15264 | 15264 |
| 9 | 15840 | 16416 | 16416 | 16416 | 16416 | 16992 | 16992 | 16992 | 16992 | 17568 |
| 10 | 17568 | 18336 | 18336 | 18336 | 18336 | 18336 | 19080 | 19080 | 19080 | 19080 |
| 11 | 20616 | 20616 | 20616 | 21384 | 21384 | 21384 | 21384 | 22152 | 22152 | 22152 |
| 12 | 22920 | 23688 | 23688 | 23688 | 23688 | 24496 | 24496 | 24496 | 24496 | 25456 |
| 13 | 26416 | 26416 | 26416 | 26416 | 27376 | 27376 | 27376 | 27376 | 28336 | 28336 |
| 14 | 29296 | 29296 | 29296 | 29296 | 30576 | 30576 | 30576 | 30576 | 31704 | 31704 |
| 15 | 30576 | 31704 | 31704 | 31704 | 31704 | 32856 | 32856 | 32856 | 34008 | 34008 |
| 16 | 32856 | 32856 | 34008 | 34008 | 34008 | 34008 | 35160 | 35160 | 35160 | 35160 |
| 17 | 36696 | 36696 | 36696 | 37888 | 37888 | 37888 | 39232 | 39232 | 39232 | 39232 |
| 18 | 40576 | 40576 | 40576 | 40576 | 42368 | 42368 | 42368 | 42368 | 43816 | 43816 |
| 19 | 43816 | 43816 | 43816 | 45352 | 45352 | 45352 | 46888 | 46888 | 46888 | 46888 |
| 20 | 46888 | 46888 | 48936 | 48936 | 48936 | 48936 | 48936 | 51024 | 51024 | 51024 |
| 21 | 51024 | 51024 | 51024 | 52752 | 52752 | 52752 | 52752 | 55056 | 55056 | 55056 |
| 22 | 55056 | 55056 | 55056 | 57336 | 57336 | 57336 | 57336 | 59256 | 59256 | 59256 |
| 23 | 57336 | 59256 | 59256 | 59256 | 59256 | 61664 | 61664 | 61664 | 61664 | 63776 |
| 24 | 61664 | 61664 | 63776 | 63776 | 63776 | 63776 | 66592 | 66592 | 66592 | 66592 |
| 25 | 63776 | 63776 | 66592 | 66592 | 66592 | 66592 | 66592 | 68808 | 68808 | 71112 |
| 26 | 66592 | 66592 | 68808 | 68808 | 68808 | 71112 | 71112 | 71112 | 71112 | 73712 |

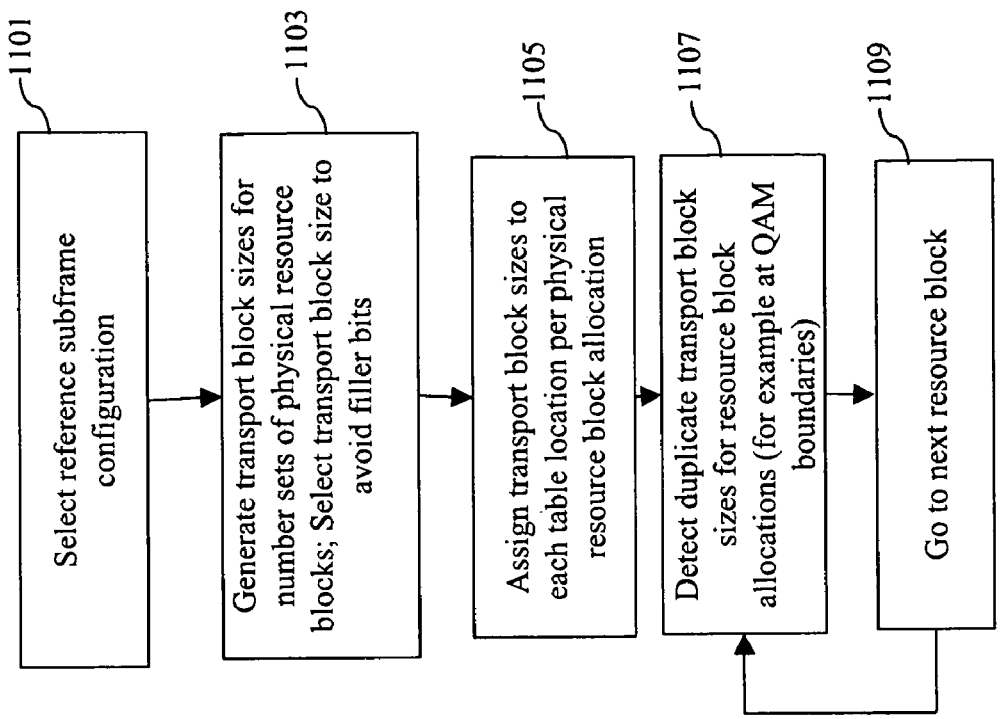

| $I_{MCS}$ MCS Index | $1203$ Modulation Order | $I_{TBS}$ TBS Index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

| i | TBS-L1 | TBS-L2 | i | TBS-L1 | TBS-L2 | i | TBS-L1 | TBS-L2 | i | TBS-L1 | TBS-L2 | i | TBS-L1 | TBS-L2 |
|---|---|---|---|---|---|---|---|---|---|---|---|---|---|---|
| 0 | 16 | 32 | 41 | 584 | 1160 | 82 | 2152 | 4264 | 123 | 8504 | 16992 | 164 | 37888 | 76208 |
| 1 | 24 | 48 | 42 | 600 | 1192 | 83 | 2216 | 4392 | 124 | 8760 | 17568 | 165 | 39232 | 78704 |
| 2 | 32 | 56 | 43 | 616 | 1224 | 84 | 2280 | 4584 | 125 | 9144 | 18336 | 166 | 40576 | 81176 |
| 3 | 40 | 80 | 44 | 632 | 1256 | 85 | 2344 | 4776 | 126 | 9528 | 19080 | 167 | 42368 | 84760 |
| 4 | 48 | 88 | 45 | 648 | 1288 | 86 | 2408 | 4776 | 127 | 9912 | 19848 | 168 | 43816 | 87936 |
| 5 | 56 | 104 | 46 | 680 | 1352 | 87 | 2472 | 4968 | 128 | 10296 | 20616 | 169 | 45352 | 90816 |
| 6 | 72 | 136 | 47 | 696 | 1384 | 88 | 2536 | 5160 | 129 | 10680 | 21384 | 170 | 46888 | 93800 |
| 7 | 80 | 160 | 48 | 712 | 1416 | 89 | 2600 | 5160 | 130 | 11064 | 22152 | 171 | 48936 | 97896 |
| 8 | 88 | 176 | 49 | 744 | 1480 | 90 | 2664 | 5352 | 131 | 11448 | 22920 | 172 | 51024 | 102928 |
| 9 | 104 | 208 | 50 | 776 | 1544 | 91 | 2728 | 5544 | 132 | 11832 | 23688 | 173 | 52752 | 105528 |
| 10 | 120 | 232 | 51 | 808 | 1608 | 92 | 2792 | 5544 | 133 | 12216 | 24496 | 174 | 55056 | 110136 |
| 11 | 136 | 272 | 52 | 840 | 1672 | 93 | 2856 | 5736 | 134 | 12576 | 25456 | 175 | 57336 | 115040 |
| 12 | 152 | 304 | 53 | 872 | 1736 | 94 | 2984 | 5992 | 135 | 12960 | 25456 | 176 | 59256 | 118536 |
| 13 | 160 | 320 | 54 | 904 | 1800 | 95 | 3112 | 6200 | 136 | 13536 | 27376 | 177 | 61664 | 124464 |
| 14 | 176 | 344 | 55 | 936 | 1864 | 96 | 3240 | 6456 | 137 | 14112 | 28336 | 178 | 63776 | 128496 |
| 15 | 200 | 392 | 56 | 968 | 1928 | 97 | 3368 | 6712 | 138 | 14688 | 29296 | 179 | 66592 | 133208 |
| 16 | 208 | 408 | 57 | 1000 | 1992 | 98 | 3496 | 6968 | 139 | 15264 | 30576 | 180 | 68808 | 137792 |
| 17 | 232 | 456 | 58 | 1032 | 2088 | 99 | 3624 | 7224 | 140 | 15840 | 31704 | 181 | 71112 | 142248 |
| 18 | 248 | 488 | 59 | 1064 | 2152 | 100 | 3752 | 7480 | 141 | 16416 | 32856 | 182 | 73712 | 148176 |
| 19 | 264 | 520 | 60 | 1096 | 2216 | 101 | 3880 | 7736 | 142 | 16992 | 34008 | 183 | 75376 | 151376 |
| 20 | 272 | 536 | 61 | 1128 | 2280 | 102 | 4008 | 7992 | 143 | 17568 | 35160 | | | |
| 21 | 280 | 552 | 62 | 1160 | 2344 | 103 | 4136 | 8248 | 144 | 18336 | 36696 | | | |
| 22 | 288 | 568 | 63 | 1192 | 2408 | 104 | 4264 | 8504 | 145 | 19080 | 37888 | | | |
| 23 | 296 | 584 | 64 | 1224 | 2472 | 105 | 4392 | 8760 | 146 | 19848 | 39232 | | | |
| 24 | 304 | 600 | 65 | 1256 | 2536 | 106 | 4584 | 9144 | 147 | 20616 | 40576 | | | |
| 25 | 320 | 632 | 66 | 1288 | 2600 | 107 | 4776 | 9528 | 148 | 21384 | 42368 | | | |
| 26 | 336 | 680 | 67 | 1320 | 2664 | 108 | 4968 | 9912 | 149 | 22152 | 43816 | | | |
| 27 | 344 | 680 | 68 | 1352 | 2728 | 109 | 5160 | 10296 | 150 | 22920 | 45352 | | | |
| 28 | 376 | 744 | 69 | 1384 | 2792 | 110 | 5352 | 10680 | 151 | 23688 | 46888 | | | |
| 29 | 392 | 776 | 70 | 1416 | 2856 | 111 | 5544 | 11064 | 152 | 24496 | 48936 | | | |
| 30 | 408 | 808 | 71 | 1480 | 2984 | 112 | 5736 | 11448 | 153 | 25456 | 51024 | | | |
| 31 | 424 | 840 | 72 | 1544 | 3112 | 113 | 5992 | 11832 | 154 | 26416 | 52752 | | | |
| 32 | 440 | 872 | 73 | 1608 | 3240 | 114 | 6200 | 12576 | 155 | 27376 | 55056 | | | |
| 33 | 456 | 904 | 74 | 1672 | 3368 | 115 | 6456 | 12960 | 156 | 28336 | 57336 | | | |
| 34 | 472 | 936 | 75 | 1736 | 3496 | 116 | 6712 | 13536 | 157 | 29296 | 59256 | | | |
| 35 | 488 | 968 | 76 | 1800 | 3624 | 117 | 6968 | 14112 | 158 | 30576 | 61664 | | | |
| 36 | 504 | 1000 | 77 | 1864 | 3752 | 118 | 7224 | 14688 | 159 | 31704 | 63776 | | | |
| 37 | 520 | 1032 | 78 | 1928 | 3880 | 119 | 7480 | 14688 | 160 | 32856 | 66592 | | | |
| 38 | 536 | 1064 | 79 | 1992 | 4008 | 120 | 7736 | 15264 | 161 | 34008 | 68808 | | | |
| 39 | 552 | 1096 | 80 | 2024 | 4008 | 121 | 7992 | 15840 | 162 | 35160 | 71112 | | | |
| 40 | 568 | 1128 | 81 | 2088 | 4136 | 122 | 8248 | 16416 | 163 | 36696 | 73712 | | | |

| MCS Index | modulation | coding rate x 1024 | efficiency | Comments | Code Rate |
|---|---|---|---|---|---|
| 0 | 2 | 120 | 0.2344 | from CQI table | 0.1171875 |
| 1 | 2 | 157 | 0.3057 | Average Efficiency | 0.15332031 |
| 2 | 2 | 193 | 0.377 | from CQI table | 0.18847656 |
| 3 | 2 | 251 | 0.4893 | Average Efficiency | 0.24511719 |
| 4 | 2 | 308 | 0.6016 | from CQI table | 0.30078125 |
| 5 | 2 | 379 | 0.7393 | Average Efficiency | 0.37011719 |
| 6 | 2 | 449 | 0.877 | from CQI table | 0.43847656 |
| 7 | 2 | 526 | 1.0264 | Average Efficiency | 0.51367188 |
| 8 | 2 | 602 | 1.1758 | from CQI table | 0.58789063 |
| 9 | 2 | 679 | 1.3262 | Average Efficiency | 0.66308594 |
| 10 | 4 | 340 | 1.3262 | overlap | 0.33203125 |
| 11 | 4 | 378 | 1.4766 | from CQI table | 0.36914063 |
| 12 | 4 | 434 | 1.69535 | Average Efficiency | 0.42382813 |
| 13 | 4 | 490 | 1.9141 | from CQI table | 0.47851563 |
| 14 | 4 | 553 | 2.1602 | Average Efficiency | 0.54003906 |
| 15 | 4 | 616 | 2.4063 | from CQI table | 0.6015625 |
| 16 | 4 | 658 | 2.5684 | Average Efficiency | 0.64257813 |
| 17 | 6 | 438 | 2.5684 | overlap | 0.42773438 |
| 18 | 6 | 466 | 2.7305 | from CQI table | 0.45507813 |
| 19 | 6 | 517 | 3.0264 | Average Efficiency | 0.50488281 |
| 20 | 6 | 567 | 3.3223 | from CQI table | 0.55371094 |
| 21 | 6 | 616 | 3.6123 | Average Efficiency | 0.6015625 |
| 22 | 6 | 666 | 3.9023 | from CQI table | 0.65039063 |
| 23 | 6 | 719 | 4.21285 | Average Efficiency | 0.70214844 |
| 24 | 6 | 772 | 4.5234 | from CQI table | 0.75390625 |
| 25 | 6 | 822 | 4.8193 | Average Efficiency | 0.80273438 |
| 26 | 6 | 873 | 5.1152 | from CQI table | 0.85253906 |
| 27 | 6 | 910 | 5.33495 | Average Efficiency | 0.88867188 |
| 28 | 6 | 948 | 5.5547 | from CQI table | 0.92578125 |
| 29 | Reserved | | | | |
| 30 | Reserved | | | | |
| 31 | Reserved | | | | |

FIG. 14

METHOD AND APPARATUS FOR TRANSPORT BLOCK SIGNALING IN A WIRELESS COMMUNICATION SYSTEM

FIELD OF THE DISCLOSURE

The present disclosure is related to wireless communications systems generally, and more specifically to allocation and signaling of radio resources and modulation and coding schemes to a mobile communication device.

BACKGROUND

Increased mobile data usage and expected future mobile data usage and applications have been anticipated by various organizations such as the Third Generation Partnership Project (3GPP) and its Long Term Evolution (LTE) efforts. According to Release 8 of the Evolved UMTS Evolved Terrestrial Radio Access ("E-UTRA") standard, downlink communications from a base station (also referred to as a base transceiver station (BTS) or an "enhanced Node-B" (eNB)) to a wireless communication device (e.g. a mobile station or also referred to as "user equipment" or "UE") utilize orthogonal frequency division multiplexing (OFDM). The OFDM orthogonal subcarriers, used for communication with a UE, may be contiguous or noncontiguous and the downlink data modulation may be performed using Quadrature Amplitude Modulation (QAM), Quadrature Phase Shift-Keying (QPSK), 16-ary QAM (16QAM), or 64QAM. In contrast to the downlink, uplink communication from the UE to the eNB utilizes Single-Carrier Frequency Division Multiple Access (SC-FDMA) according to the E-UTRA standard. In SC-FDMA, block transmission of QAM data symbols is performed by first discrete Fourier transform (DFT)-spreading (or preceding) followed by subcarrier mapping to a conventional OFDM modulator. The data transmission from the mobile station or UE in the uplink is controlled by the eNB, and involves transmission of scheduling requests (and scheduling information) sent to the UE via downlink control channels. Scheduling grants for uplink transmissions are provided by the eNB on the downlink and include, among other things, a resource allocation (e.g., a resource block size per one millisecond (ms) interval) and an identification of the modulation to be used for the uplink transmissions. With the addition of higher-order modulation and adaptive modulation and coding (AMC), large spectral efficiency is possible by scheduling users with favorable channel conditions.

E-UTRA systems also facilitate the use of multiple input and multiple output (MIMO) antenna systems on the downlink. For example, MIMO antenna systems may be employed at the eNB through use of multiple transmit antennas and at the UE through use of multiple receive antennas. Such multiple antenna systems and MIMO operation may enhance either the UE's data throughput (single user MIMO) or the base station's data throughput (multi-user MIMO) if the base station employs multiple antennas. In such cases, UEs may share resources which provides even further spectral efficiency.

An eNB transmits a pilot or reference symbol and a UE, within the eNB's radio coverage area, may receive and use this information for channel estimation, subsequent data demodulation, and as a link quality measurement reference for reporting parameters related to the UE's radio reception. The link quality measurements, which are provided from a UE for feedback, may include spatial parameters such as rank indicator, or the number of data streams sent on the same resources; precoding matrix index (PMI); and coding parameters, such as a modulation and coding scheme (MCS) or a channel quality indicator (CQI). For example, if a UE determines that the link can support a rank greater than one, it may report multiple CQI values (e.g., two CQI values when rank=2). The reports may include wideband or sub-band frequency selective information of the parameters. The eNB may use the rank information, the CQI, and other parameters, such as uplink quality information, to serve the UE on the uplink and downlink channels.

In accordance with the E-UTRA standard, to send downlink data to the UE (or request uplink data from the UE), the eNB transmits a scheduling message (e.g., a scheduling grant message) via downlink control information (DCI) on a downlink control channel (e.g., a physical downlink control channel (PDCCH)) providing parameters for the desired data transmission scheme. The UL grant contains parameters provided by the eNB for use in generating the uplink subframe, including transport block size, data modulation and coding scheme, hybrid automatic repeat request (HARQ) information such as Redundancy Version (RV), resource allocation (e.g., resource blocks and position within overall system bandwidth), power control information, and other control information. Similarly, the DL assignments contain parameters provided by the eNB used in decoding the downlink subframe including transport block size, data modulation and coding scheme, resource allocation (e.g., resource blocks and position within overall system bandwidth), HARQ information, precoding matrix information, and other control information. The UL grants and DL assignments are typically transmitted over the PDCCH.

The OFDM downlink provides a subcarrier spacing of 15 kHz and a maximum of approximately 1320 subcarriers. Of course, the number of subcarriers available to a network operator depends on their available system bandwidth, that is, from 1.4 MHz to 20 MHz channel bandwidths. The control channel, i.e., PDCCH, transmissions consists of typically 1~3 OFDM symbols at the beginning of each 1-ms sub-frame. Typically an OFDM symbol comprises of an integer number of time units (or samples), where a time unit denotes a fundamental reference time duration. For example, in LTE, the time unit corresponds to $1/(15000 \times 2048)$ seconds. Thus, the PDCCH transmissions are a first control region with a fixed starting location (temporaneously) at the first OFDM symbol in a sub-frame. All the remaining symbols in a sub-frame after the PDCCH are typically for data-carrying traffic, i.e., PDSCH, assigned in multiples of Resource Blocks (RBs). Typically, an RB comprises of a set of subcarriers and a set of OFDM symbols. The smallest resource unit for transmissions is denoted a resource element which is given by the smallest time-frequency resource unit (one subcarrier by one OFDM symbol). For example, an RB may contain 12 subcarriers (with a subcarrier separation of 15 kHz) with 14 OFDM symbols with some subcarriers being assigned as pilot symbols, etc. Typically, the 1 ms sub-frame is divided into two slots, each of 0.5 ms. The RB is sometimes defined in terms of slot rather than sub-frame. Some RBs may be shortened or punctured to accommodate other information such as control information, synchronization signals, reference signals or pilots, sounding signals, etc.

The eNB providing the downlink transmits a subframe of 1 ms that is divided into two slots, each of 0.5 ms duration, with a Radio Frame defined as comprising ten subframes. The time-frequency resources or RBs in a subframe, which provide radio channelization, are allocated to the UEs. Further, the base station may use various modulation and coding schemes (MCS) and transport block sizes. A transport block size is the block size of the data or the number of information data bits being communicated, and this is typically the block received at the Physical layer from the MAC layer. Various modulation formats are accommodated on the downlink channels including QPSK, 16QAM and 64QAM.

In any case, such radio communication systems having allocated resources, including systems employing shared resources, may utilize various modulation and coding schemes for optimal bandwidth utilization and for optimum use of the resources for specific applications. Modulation and coding schemes may also be selected based on perceived radio propagation or noise conditions as determined by various network or user equipment (UE) based measurements. The UE must be provided with its TBS and MCS which requires signaling overhead and consumes bandwidth that otherwise could be used for data transmission.

Therefore a need exists for methods and apparatuses for determining an allocated Transport Block Size (TBS) and MCS by a UE in an efficient manner and with reduced signaling overhead.

BRIEF DESCRIPTION OF THE DRAWINGS

FIG. 3 is a diagram of a message conveying an index to a mobile station in accordance with the embodiments.

FIG. 4 is a diagram an exemplary format of a Downlink Control Information element for providing an index to a mobile station in accordance with the embodiments.

FIG. 5 is a table 500 which is an exemplary portion of a TBS/MCS table in accordance with various embodiments.

FIG. 9a through 9k is a TBS/MCS table for up to 110 PRBs in accordance with an embodiment.

FIG. 10 is a flow chart showing operation of a mobile station utilizing a table, in accordance with various embodiments.

FIG. 11 is a flow chart showing high level procedures for generating a static transport block size determination table in accordance with the embodiments.

FIG. 12 is an intermediary table that may be used in some embodiments.

FIG. 13 is an example of one-layer TBS to two-layer TBS mapping.

FIG. 14 is an example of the intermediary table that may be used in the design of the MCS/TBS table.

DETAILED DESCRIPTION

The present disclosure provides methods and apparatuses for transport block size signaling to a mobile station wherein an allocation of time-frequency resources, that is, wherein a Physical Resource Block (PRB) allocation from a base station, as well as modulation and coding scheme (MCS) information, may be signaled to a mobile station and wherein further the transport block size (TBS) is inferred from the MCS and PRB allocation of the mobile station.

A TBS/MCS table, in accordance with the embodiments, may be accessed by a mobile station using a 5-bit MCS index field that the mobile station may use to perform a table lookup operation. The MCS index field may reserve three states for implicit modulation order and TBS signaling for retransmissions (e.g. in the downlink) or for signaling an implicit Redundancy Version (RV) (e.g. in the uplink). An MCS table in accordance with one embodiment may therefore provide 29 MCS per PRB allocation in addition to the three MCS reserved entries for implicit TBS and modulation signaling (or RV signaling). The methods and apparatuses disclosed herein, among other things, may generate statically defined MCS tables consisting of transport block sizes (TBS) computed for 29 MCSs for each of j PRBs where $j=1, \ldots, N_{RB}^{DL}$, where DL is the downlink and RB is a resource block available on the downlink. The methods and apparatuses herein disclosed are also applicable to determining the transport block sizes for the uplink. Furthermore, frequency division duplex (FDD), Time Division Duplex (TDD) or any other appropriate multiplexing technique may be used in the various embodiments.

Figure 1:
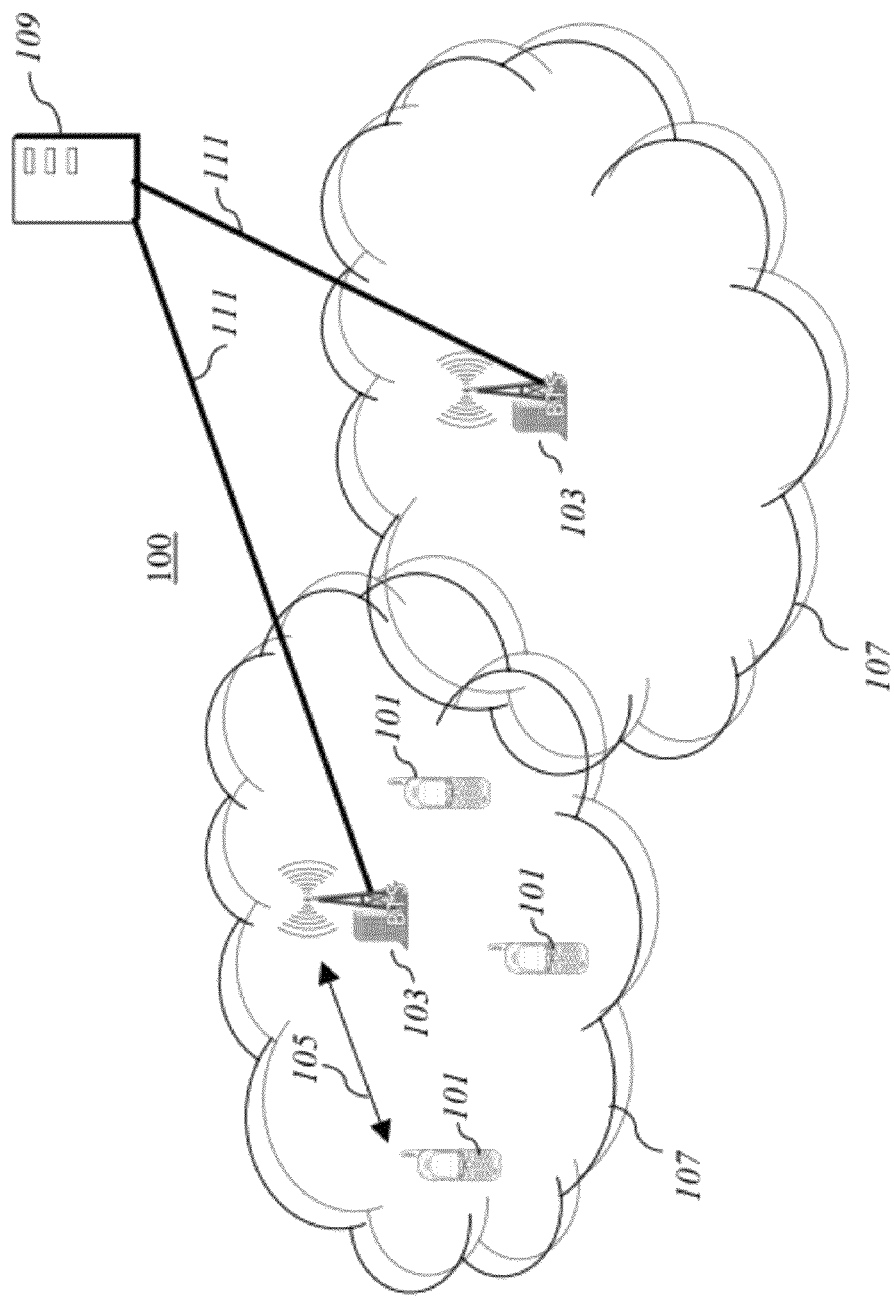
FIG. 1 is a block diagram of a wireless communication network.

Turning now to the drawings wherein like numerals represent like components, FIG. 1 illustrates a communications network 100, with various base stations 103, each base station 103 having a corresponding coverage area 107. In general, base station coverage areas may overlap and, in general, form an overall network coverage area. The base stations may be referred to by other names such as base transceiver station (BTS), "Node-B", and access node (AN), an access point, access terminal, base, base unit, base station (BS), eNode-B, eNB, Home Node-B, relays, relay terminal or relay node (RN), or by other terminology used in the art. A network coverage area may comprise a number of base station coverage areas 107, which may form a contiguous radio coverage area. However, it is not required to have contiguous radio coverage and therefore a network coverage area may alternatively be distributed.

Furthermore, each coverage area may have a number of mobile stations 101. The base stations are generally part of a radio access network (RAN) that includes one or more controller entities communicably coupled to one or more corresponding base stations. The RAN is generally coupled to one or more core networks, which may be coupled to other networks, like the Internet and public switched telephone networks, among others. These and other elements of the access and core networks are not illustrated but are known by those having ordinary skill in the art. A number of bases stations 103 may therefore be connected to a base station controller 109 via backhaul connections 111. Note that the base station controller 109 may alternatively be implemented as a distributed function among the base stations 103. Regardless of specific implementations, the base station controller 109 comprises various modules for packetized communications such as a packet scheduler, packet segmentation and reassembly, etc., and modules for assigning appropriate radio resources to the various mobile stations 101.

The base stations 103 may communicate with the mobile stations 101 via any number of standard air interfaces and using any number of modulation and coding schemes. For example, Universal Mobile Telecommunications System (UMTS), Evolved UMTS (E-UMTS) Terrestrial Radio Access (E-UTRA) may be employed. Further, E-UMTS may employ Orthogonal Frequency Division Multiplexing (OFDM) and/or may employ orthogonal spreading codes such as the Walsh codes. Semi-orthogonal spreading codes may also be utilized to achieve additional channelization over the air interface. Further the network may be an Evolved High Rate Packet Data (E-HRPD) network. Any appropriate radio interface may be employed by the various embodiments wherein radio resources are assigned and wherein various modulation and coding schemes may be employed.

Figure 2:
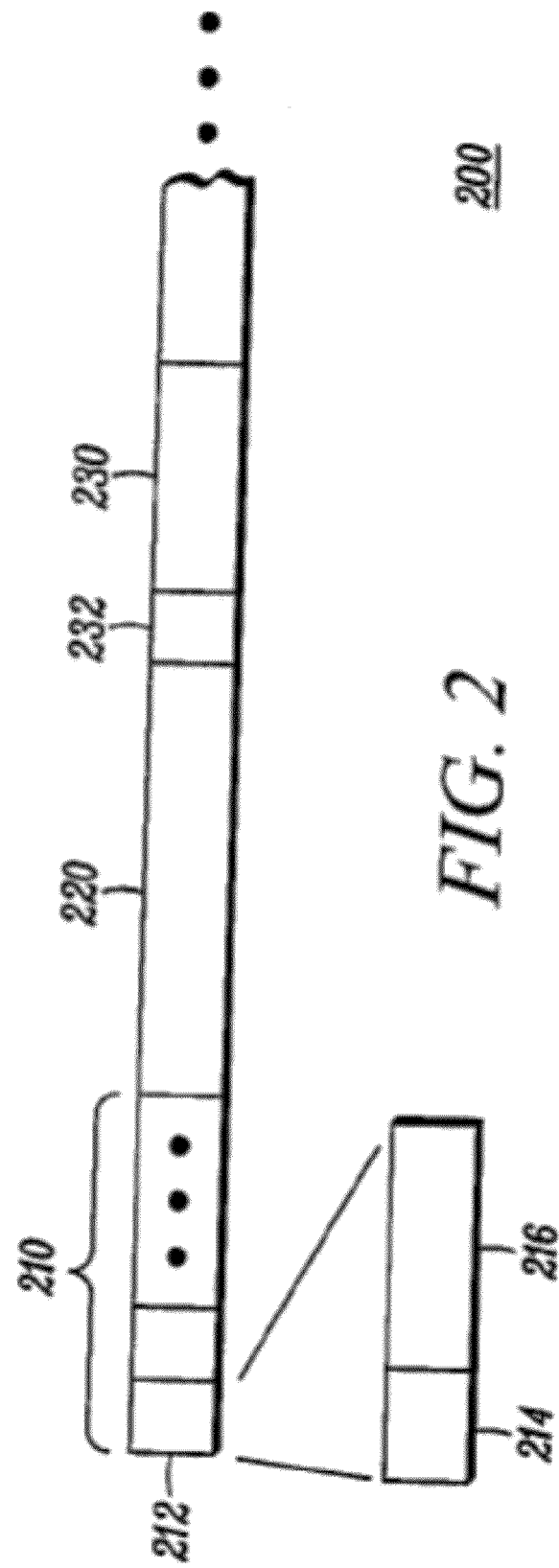
FIG. 2 is block diagram of a sequence of radio frames each comprising a several frames.

FIG. 2 illustrates a sequence of radio frames 200 useful for communicating in the wireless communication systems of the various embodiments. A radio frame 210 of the present embodiments may comprise 10 subframes with each subframe being approximately 1 ms in duration. Each subframe 212 may contain a resource assignment control channel portion within the PDCCH, the control channel portion 214, and the remaining portion in a sub-frame after the PDCCH is typically for data-carrying traffic, i.e., physical downlink shared channel (PDSCH) or the data channel portion 216. In FIG. 2, a super frame may also be structured as a number of radio frames 210, 220, 230, etc. Interlace patterns may also be utilized in the various embodiments in data channel portion 216.

For orthogonal frequency division multiple access (OFDMA) systems, the frequency domain is divided into subcarriers. For example, a 5 MHz OFDMA carrier, may be divided into 300 subcarriers, with a subcarrier spacing of 15 kHz. An OFDMA subframe may be divided into multiple OFDM symbols. For example, a subframe may occupy approximately 1 ms and contain 14 OFDM symbols, wherein each symbol occupies approximately $1/14$ ms. The subcarriers are grouped to form resource blocks (RBs) as described previously. The resource blocks can have either physically contiguous subcarriers or noncontiguous subcarriers. A virtual resource block is a resource block whose subcarriers are non-contiguous in frequency, whereas a localized RB is an RB whose subcarriers are contiguous in frequency. Virtual RBs may provide improved performance due to frequency diversity while localized RBs may be beneficial in frequency-dependent scheduling.

In the various embodiments, the base station controller 109, the base stations 103, or some other network infrastructure component provides resource allocation information to the mobile stations. Mobile stations may also be grouped by the base station 103, or base station controller 109, into one or more groups for scheduling purposes, for example, for transmitting broadcast information such as System Information. The mobile stations 101 may be grouped based on radio channel conditions associated with the mobile stations, for example, channel quality information reported by the mobile stations, Doppler reported by the mobile stations, distance from the serving cell, etc. Alternatively, or additionally, the mobile stations 101 may be grouped based on one or more mobile station operating characteristics other than participation in a common communication session. Exemplary mobile station operating characteristics include power headroom of the mobile stations, macro diversity considerations, mobile station capability, service of the mobile station, codec rate, etc. Further, mobile stations with an active VoIP session may be grouped together.

For each mobile station individually, or for each mobile station group, a scheduling function of the base station controller 109, or base station 103, may assign a set of time-frequency resources, which may also be referred to herein as Physical Resource Blocks (PRBs) (or RBs). In accordance with the embodiments, each mobile station may determine its portion of the shared resource, based on indexing information received in a downlink control information (DCI) message.

An indication of the set of shared resources, and other control and/or system related information, may be signaled from the base station 103 to the mobile stations 101 using a control channel. Further, the control channel may be transmitted in any subframe with a pre-defined relationship with the beginning subframe of the set of shared resources. The set of shared resources may begin in the same subframe the control channel is transmitted, may have a fixed starting point relative to the frame that the control channel is transmitted, or may be explicitly signaled in the control channel.

In one embodiment where mobile stations are grouped, each mobile station may be assigned a position (also called location) within the group, and a set of shared resources is assigned to the group. The base station 103 may also indicate which mobile stations are active in a given time period, and, in some embodiments, the number of assigned resources assigned to each mobile station. In any case, a mobile station will be assigned a set of PRBs by the base station and will receive this information on a downlink channel such as the PDCCH or a higher layer signalling. It is noted that the PDCCH region may contain several uplink grants and downlink assignments meant for possibly different mobiles.

FIG. 3 illustrates how resource assignments, that is PRB assignments, may be indicated to a mobile station in a downlink message 300. In FIG. 3, a first message field, mobile station assignments 310, may indicate the number and location of the PRBs assigned to the mobile station from the set of available resources (PRBs). The mobile station may be identified by a UE Identifier or Radio Network Temporary Identifier (RNTI) which may be explicitly included in the message field or implicitly encoded with the CRC code. In accordance with the embodiments, the message 300 may also include an MCS Index field 320 to provide a reference that the mobile station may use to determine an appropriate Transport Block Size (TBS) and an appropriate Modulation and Coding Scheme (MCS). A mobile station may use the MCS Index field 320 in conjunction with a TBS/MCS table to determine its TBS corresponding to its PRB assignments. In the various embodiments, the MCS Index field 320 may be a five bit field as will be described further below.

FIG. 4 illustrates an embodiment of a DCI element 400 for conveying an MCS Index 420 to a mobile station. The DCI message may include a 3-bit header and a resource assignment block 410 having N-bits, that is, the number of bits necessary to convey resource assignments to the mobile or to a mobile station group. The MCS Index 420 may be at least 5 bits in the DCI element as shown. The DCI element 400 may also include padding bits 430, and cyclic redundancy check bits 440 as shown. It is noted that the DCI format size may depend on various factors including the system bandwidth, MIMO or non-MIMO mode, etc.

Therefore FIG. 4 is representative of a bit mapping of a downlink message, which may contain a Downlink Control Information (DCI) element, where the bit mapping may be used to convey MCS Index information to a mobile station. The DCI element may be sent to the mobile station via the PDCCH, or by any other appropriate downlink message. In the case of a mobile station group as discussed above, the DCI element may be sent using a shared control channel using a shared RNTI such as SI-RNTI. The DCI element may comprise a number of bits, and may vary in size depending on, for example in some embodiments, the number of mobile stations in a group, sharing the control channel, or the number of PRB assignments being made during the specific subframe in which the DCI element is transmitted. Therefore, the information element may be any appropriate size for conveying the necessary information to a mobile station or to a group of mobile stations. For example, mobile station PRB assignments field 410 may utilize any number of required bits. However, in accordance with the embodiments, the MCS Index 420 will take up at least five bit positions of the information element 400. The at least five bit positions of the MCS Index 420 need not be contiguous, provided that a mobile station knows the bit map locations where the MCS Index 420 will be inserted in the information element 400. Thus, in accordance with the embodiments, a mobile station will receive a downlink message, containing an MCS Index and a resource assignment for that mobile station.

Figure 5:
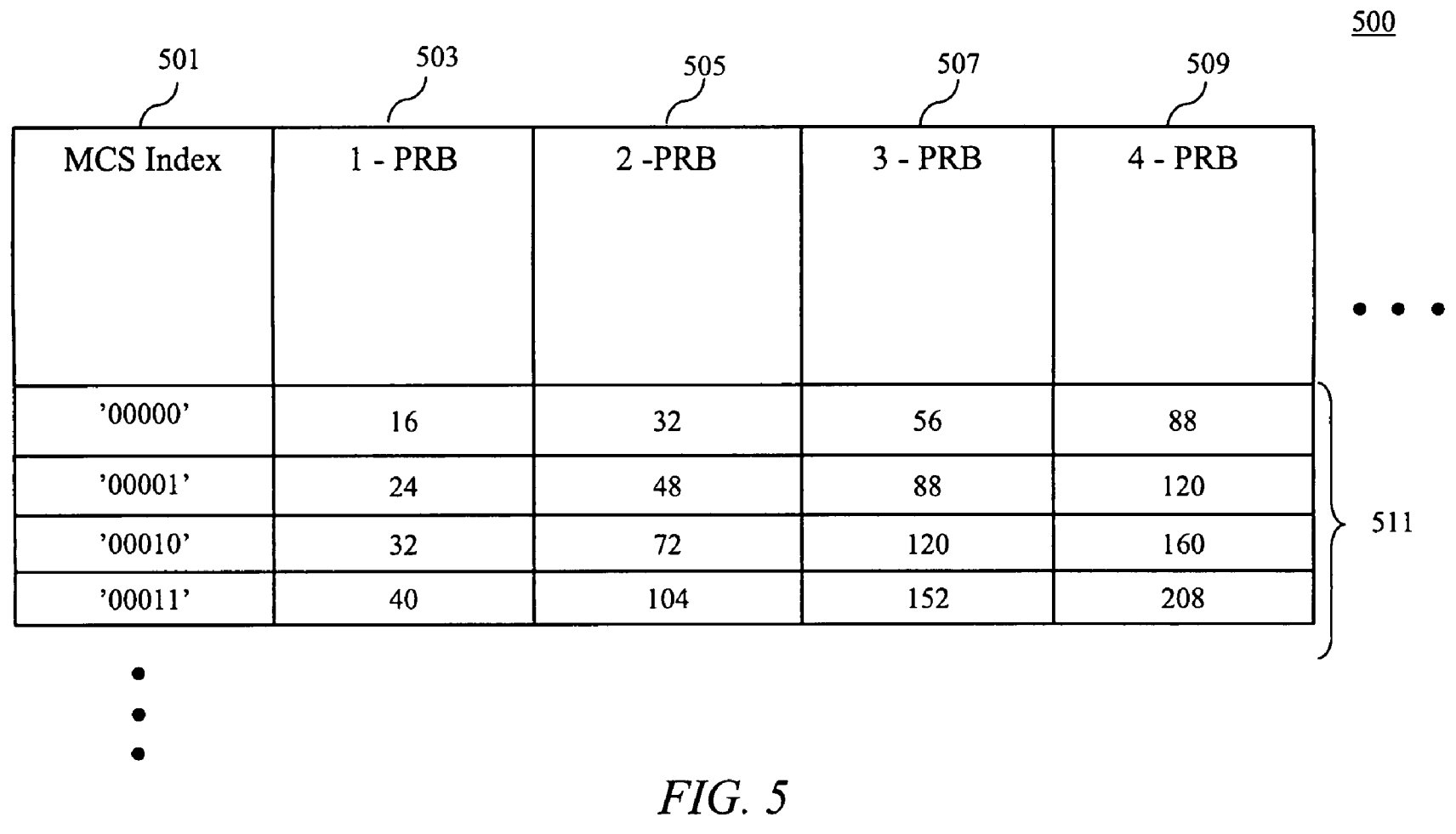

The mobile station will have, stored in a mobile station memory, a table such as table 500 illustrated in FIG. 5, in accordance with the embodiments. The table 500 is statically defined, that is, predetermined, and stored in a memory of a mobile station. The table 500 is indexed using a 5-bit MCS index (with some reserved entries) in a columnar format, shown as column 501. Lesser bit indexes may also be used in the various embodiments. Further columns are provided per PRB allocation, such as column 503 (1-PRB), column 505 (2-PRBs), column 507 (3-PRBs) and column 509 (4-PRBs). The table 500 continues for a number of PRBs and for the 32 MCS Index positions provided by the MCS Index which is at least five bits. That is, the MCS Index provides for a maximum binary value of "11111" which translates to 31 base ten index positions. The mobile station may use the table 500 in conjunction with the assignment information, that is, the mobile station's PRB assignments, received from a message as exemplified in FIG. 3 or FIG. 4.

Figure 6:
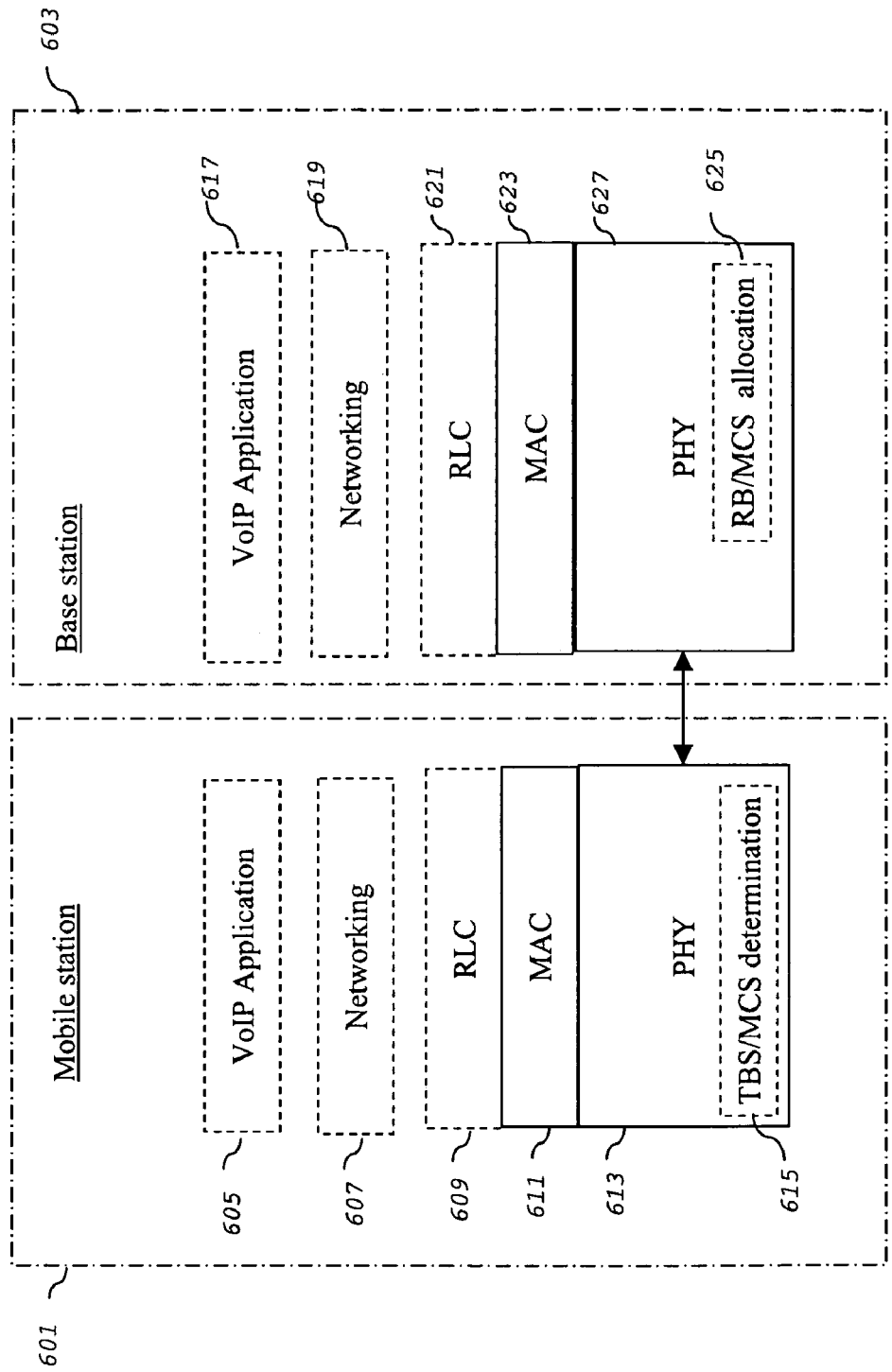
FIG. 6 is a block diagram of a mobile station and base station architecture in accordance with various embodiments.

Turning now to FIG. 6, a mobile station 601 and base station 603 architectures in accordance with the various embodiments are illustrated. Mobile station 601 comprises a stack having a VoIP or data application 605, a networking layer 607, a Radio Link Control (RLC) layer 609, a Medium Access Control (MAC) layer 611, and a Physical Layer (PHY) 613. In addition, mobile station 601 has a TBS/MCS determination component 615, which may be part of the PHY layer 613 as shown, or may be separate or may be integrated into any of the other components/layers, for example the MAC layer 611.

The base station 603 similarly has a VoIP or data application 617, a networking layer 619, a RLC 621, MAC 623 and PHY 627. However, base station 603 additionally has, in the various embodiments, RB/MCS allocation component 625. As described in detail above, the mobile station 601 TBS/MCS determination component 615, may include accessing a predetermined TBS/MCS table such that by using an MCS index received from the base station 603, may perform a lookup of its TBS and MCS for a given assignment. The RB/MCS allocation component 625 of base station 603 likewise will communicate and interact with other components/layers as required, to communication an MCS index to the mobile station TBS/MCS determination component 615.

It is to be understood that the term "component" as used herein includes software and/or firmware executing on one or more programmable processors, ASICs, DSPs, hardwired logic or combinations thereof. Therefore, in accordance with the embodiments, TBS/MCS determination component 615, and/or RB/MCS allocation component 625, etc., may be implemented in any appropriate manner (i.e. as software and/or firmware executing on one or more programmable processors, ASICs, DSPs, hardwired logic or combinations, etc.) and would remain in accordance with the embodiments herein disclosed.

Figure 7:
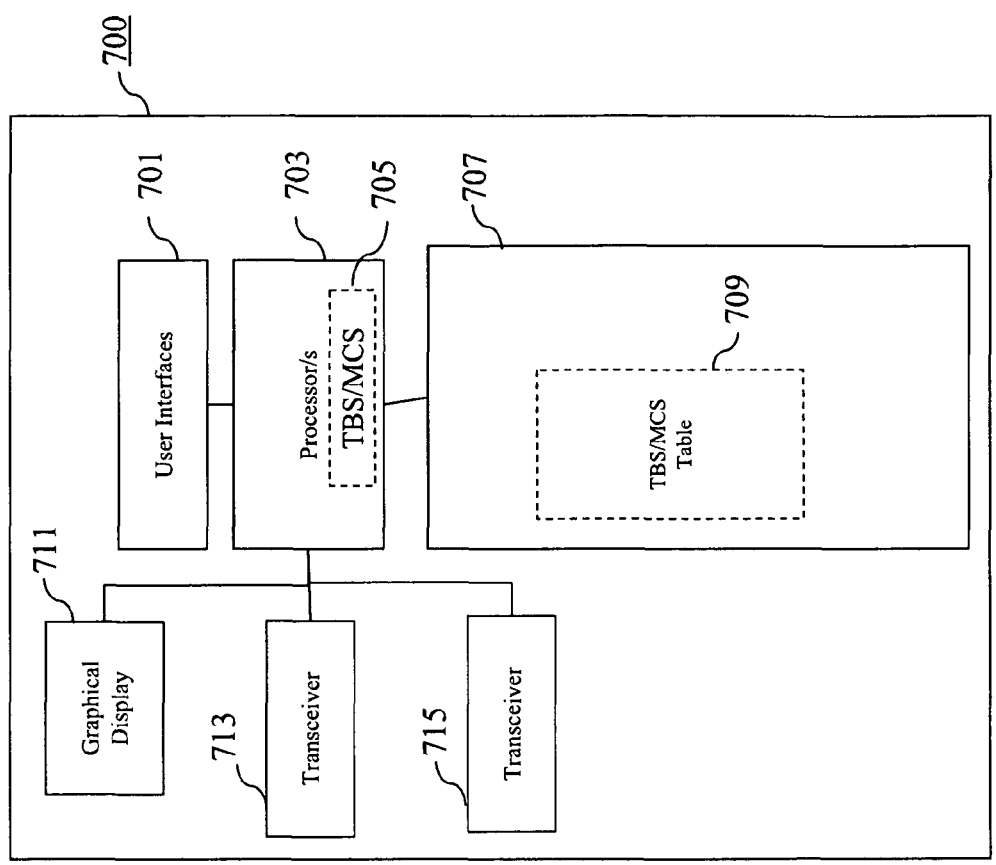
FIG. 7 is a block diagram of a mobile station in accordance with various embodiments.

FIG. 7 is a block diagram illustrating the primary components of a mobile station 700 in accordance with some embodiments. Mobile station 700 comprises user interfaces 701, at least one processor 703, and at least one memory 707. Memory 707 may have storage sufficient for a mobile station operating system, applications and general file storage. Mobile station 700 user interfaces 701, may be a combination of user interfaces including but not limited to a keypad, touch screen, voice activated command input, and gyroscopic cursor controls. Mobile station 700 has a graphical display 711, which may also have a dedicated processor and/or memory, drivers etc. which are not shown in FIG. 7.

It is to be understood that FIG. 7 is for illustrative purposes only and is for illustrating the main components of a mobile station in accordance with the present disclosure, and is not intended to be a complete schematic diagram of the various components and connections there-between required for a mobile station. Therefore, a mobile station may comprise various other components and connections not shown in FIG. 10 and still be within the scope of the present disclosure.

The mobile station 700 may also comprise a number of transceivers such as transceivers 713 and 715. Transceivers 713 and 715 may be for communicating with various wireless networks using various standards such as, but not limited to, UMTS, E-UMTS, E-HRPD, CDMA2000, 802.11, 802.16, etc.

Memory 707 is for illustrative purposes only and may be configured in a variety of ways and still remain within the scope of the present disclosure. For example, memory 707 may be comprised of several elements each coupled to the processor 703. Further, separate processors and memory elements may be dedicated to specific tasks such as rendering graphical images upon a graphical display. In any case, the memory 707 will store a TBS/MCS Table 709 in accordance with the embodiment. A TBS/MCS component 705 executing on processor 703, may access the TBS/MCS Table 709, in memory 707, and use the Table 709 for determining the mobile station 700 TBS and MCS for a given resource assignment. For example, TBS/MCS component 705 may access TBS/MCS Table 709 and use an index, such as an MCS index, received from a base station, and perform a table lookup to determine its TBS and MCS for a given assignment. The TBS/MCS component 705 and the TBS/MCS Table 709 may be stored on one, or more, computer readable media such as one or more flash memories, one or more Compact Disc's (CD's), one or more DVDs, on or more EEPROM's, etc, and may be transferred to and from various network entities such as eNBs, controllers and, with respect to FIG. 7, mobile stations. The TBS/MCS component 705 and the TBS/MCS Table 709 may therefore be transported on such computer readable media and loaded into memory of various network entities and/or mobile devices as needed. Additionally, the TBS/MCS component 705 and the TBS/MCS Table 709 may be downloaded or uploaded via wireline (such as over the Internet) or via Over-the-Air (OTA) upgrades that may from time-to-time be performed to upgrade mobile stations (i.e. UEs) that access the network. For example, a network operator may, via any suitable approach such as, but not limited to, OTA upgrades, provide the TBS/MCS component 705 and the TBS/MCS Table 709 to mobile stations of its service subscribers. Likewise with respect to FIG. 6, the RB/MCS allocation component 625 and the TBS/MCS Table may be provided to a base station via any suitable approach including, but not limited to, uploading to or downloading from, a central storage point such as, for example, a Radio Operation and Maintenance Center (OMCR).

Figure 8:
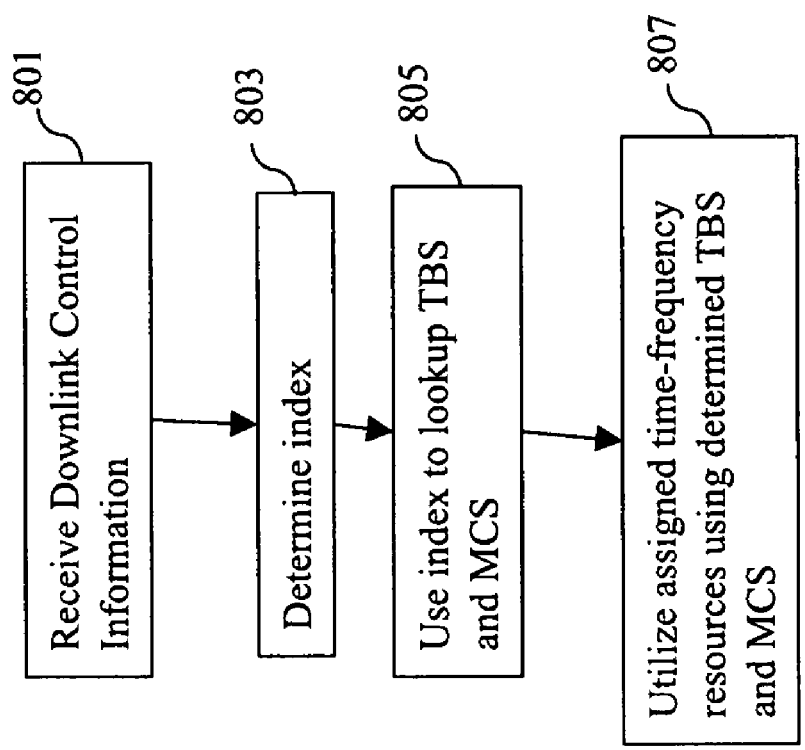
FIG. 8 is a flow chart showing operation of the mobile station in accordance with an embodiment.

FIG. 8 summarizes operation of a mobile station in accordance with the various embodiments. Thus, in 801 a mobile station receives a Downlink Control Information (DCI) element from a base station including an index. The index may be a set of bits contained in a bit map position of a grant message, or a scheduling and assignment message as was discussed previously with respect to FIGS. 3 and 4. The mobile station then determines the index as shown in 803, which may include reading the index from predetermined bit positions of a bit map contained in a DCI element. The mobile station may then, in 805, use the index to lookup an appropriate TBS and MCS to use in conjunction with the RB assignment, using for example, Table 500 illustrated in FIG. 5. In other words, the mobile station has a priori knowledge of the TBS and appropriate MCS to be used corresponding to a PRB assignment from a base station. In 807, the mobile station may proceed to use the PRBs, that is, the assigned time-frequency resources, using the determined TBS and MCS. The mobile station will use the radio resource assignment information and any Table information which may include vocoder rate, modulation, or coding information.

FIG. 9, which includes parts 9a through 9k, provides a single TBS/MCS table 900, in accordance with an embodiment. FIG. 9, table 900 is a 29-entry MCS table which provides a mobile station with a target code rate based on an MCS index position, shown in FIG. 9 as the leftmost column. The table 900, includes a 5-bit MCS index column with 3 reserved entries for modulation order signaling. In the design of table 900, the highest code rate is chosen as 0.92. In order to arrive at the table 900 design, various Channel Quality Indication (CQI) MCS values were taken as a starting point. Further, two MCS are defined for the overlap region for the change of modulation (rate=0.66 QPSK and rate=0.33 16 QAM) and (rate=0.42 16 QAM and rate=0.64 64 QAM). The remaining 13 MCS entries were selected as equally spaced between adjacent spectral efficiencies. This is shown in FIG. 14, where each row of the table corresponds to one MCS value. The second column labeled "modulation" indicates the modulation order, the third column, "coding rate×1024," indicates the coding rate×1024, and sixth column, "Code Rate," indicates the target coding rate. The fourth column, "efficiency," indicates the spectral efficiency, which is the number of bits/second/Hz, and is calculated as the coding rate×modulation order. The fifth column, "Comments," contains comments as to how the particular spectral efficiency was obtained. As can be seen the last three rows of MCS entries (rows 29, 30 and 31) may be reserved for other purposes. The TBS sizes utilized are aligned with QPP (Quadratic Polynomial Permutation) interleaver sizes and hence remove the need for insertion of filler bits. For table 900, the TBS are computed from the MCS assuming n=3 OFDM symbols for control (PCFICH=3) and 2 antennas 120 RE/PRB, and thus the single MCS table is invariant to the number of base station transmit antennas, the Physical Control Format Indicator Channel (PCFICH (n)) which denotes the number of OFDM symbols used for PDCCH in a subframe, and CP (cyclic prefix) size. Because the MCS table includes reuse for different system bandwidths, overall testing complexity is reduced, for example the MCS table section defined for 100 RB (20 MHz system bandwidth) is reused for the 25 RB case (5 MHz system bandwidth). Thus the set of TB sizes for the 25 RB case are a subset of the TB sizes for the 110 RB case corresponding to columns 1 to 25 PRBs in the TBS/MCS table 900.

The physical layer first attaches a 24-bit CRC to each transport block received from the MAC layer. This CRC may be used at the receiver to verify correct reception and to generate the HARQ ACK/NACK feedback. The transport block is then segmented or divided into, or is comprised of, "code blocks" according to a segmentation rule which, given an arbitrary transport block size, is designed to minimize the number of filler bits needed to match the available forward error correction (FEC) block sizes, for example, per the Rel-8 turbo code internal interleaver (Quadratic Polynomial Permutation) sizes (max block size=6144 bits). This is accomplished by allowing two adjacent interleaver sizes to be used when segmenting a transport block, rather than being restricted to a single interleaver size. The filler bits (if any) would then be placed in the first segment. However, in the first release of the LTE specifications, the set of possible transport block sizes may be restricted such that the segmentation rule described above always results in a single interleaver size for each code block with no filler bits. Following segmentation, a further 24-bit code block CRC is attached to each code block if the TB was split into two or more code blocks. Thus, it can also be stated that the physical layer attaches no filler bits to the transport blocks or to the code blocks while there may be transport block CRC and code block CRC bits that are inserted by the physical layer. It is noted here that there may be some padding or header introduced at the MAC layer in forming the transport block. In the embodiments, code block segmentation may be applied such that code blocks are substantially equal in size, including and taking into account any required CRC bits. That is, transport blocks may be divided as necessary to limit each code block to less than, or equal to, the number of bits suitable for the utilized FEC scheme.

Regarding TBS and subframe configurations, a downlink carrier supporting N PRBs, that is, N downlink physical resource blocks, would require an N×29 (number of rows× number of columns) MCS table that is invariant to subframe configuration. The advantage of being invariant to control region size (n) is that the Transport Block Size (TBS) does not change on retransmissions even if n changes. Only a single MCS table is required given invariance to cyclic prefix size and the number of transmit antennas in addition to invariance to n.

When the mobile station performs its search procedure, the target code rate is assumed be defined as the TBS and CRC overhead, divided by the number of physical channel bits, that is, target code rate=(TBS+CRC overhead)/(number of physical channel bits). In other words, the CRC bits (TB CRC and code-block CRC) are considered part of the information bits for purposes of rate-computation.

As an example, assuming 5 MHz (25RB), where the MCS Index=24, corresponding to 64QAM modulation (6 bits per RE), I_TBS=22, the CQI table indicates a target CR=0.753, 1RB (with 120 REs), the TBS is 520 with a 24-bit CRC. Therefore, the code rate=(520+24)/(120*6)=0.755, which is very close to the target code rate. Thus, such technique for TBS generation may be used to design a mother TBS table and use its entries to populate the N×29 entries of the MCS table 900. Thus, a mobile station may infer the TBS using the MCS table 900 via the RB allocation and the MCS index. The following provides an overview of the design procedure.

As an example, the MCS Table may be generated for 100 PRBs (or up to 110 PRBs). The design begins with an initial set of TBS with maximum MAC (Medium Access Control) padding limited to 3% (spacing between adjacent sizes, i.e., worst case padding). In this set, the padding in the lower TBS range is higher due to the QPP interleaver granularity. All the sizes in the set may be such that no filler bits or padding are attached to the transport blocks or to the code blocks as explained above. The set of some common MAC payload sizes are also included in this initial set. For example, common MAC payload sizes include buffer status report: 1 or 3 bytes, RACH (Random Access Channel): 9 bytes, RACH response: 7 bytes or 1+N*6 where N is the number of mobile stations being responded to, TCP ACK (~1+3+1 or 2+3+1 or ⅝ bytes), SID: 15 bytes, Adaptive Multi-Rate (AMR) vocoder 7.95 Kbps: 29 bytes, AMR 12.2 Kbps: 40 bytes. Exemplary MAC sizes included in the design (in bits) include 16, 24, 40, 48, 56, 72, 104, 120, 152, 200, 232, 248, 296, 320, 344, 392, 440, 488 and 536. Additionally to optimize for other VoIP or small packets, the TBSs for smaller RB allocations (e.g. <10 RBs) may be modified.

For the 110 RB case the N×29 MCS table is filled with suitable TBSs from the initial set according to best matching the code rate and modulation for a reference subframe configuration (e.g., n=3 ctrl, 120 REs/PRB, 2 antennas) with N=110 RBs. The TBSs from the initial set that do not appear in the MCS table are pruned away, and the frequency of each TBS in the MCS table is recorded. A higher frequency (or number of occurrences) enables flexibility in scheduling the TBS with different resources on a retransmission. Except for some small TBSs, the frequency is reasonably high, thus allowing good flexibility. At this stage, the frequency of preferred TBS, (for example 320) may be increased, and the padding percentage may also be adjusted, by modifying MCS table entries. The single N×29 MCS table can be used for all possible DL subframe configurations, e.g., for all 18 or more DL subframe configurations (different number of Transmit antennas, different PCFICH values, etc). Some table entries are blocked for certain subframe configurations, for example coding rate drops below minimum TBS. The same table can be used as much as possible for the uplink also. While the table has been designed assuming a maximum code rate of approximately 0.925 for 64QAM, resulting in a spectral efficiency of approximately 5.55 bits/symbol, the design can be adapted to a further higher maximum spectral efficiency using the methods and apparatuses described herein.

The MCS Table for 5 MHz ($N_{RB}^{DL}$=25) is a subset of the MCS table of the 110 RB and hence it significantly reduces testing complexity. For example, for a 5 MHz carrier the first 25 columns of the 20 MHz carriers are reused. For the 110 PRB MCS/TBS table, a total of 184 distinct TBSs may be used to populate the 3190 entries of the 29×110 MCS table.

In accordance with the embodiments, the same MCS table may be used for downlink and uplink in both TDD and FDD. To achieve this, some decimation (such as deleting RBs that are not multiples of 2, 3 or 5) may be required for the uplink. However, most embodiments will utilize the MCS table, modified as needed, for the uplink as well as the downlink. It is possible to change the modulation order associated with the rows (without changing the spectral efficiency of the entry) of the MCS/TBS table for the uplink to better adapt the table for the uplink SC-FDMA scheme.

FIG. 10 summaries operation of a mobile station in accordance with the embodiments using the table 900 illustrated in FIG. 9. The mobile station in 1001 receives the resource block (RB) assignment information and the MCS index in a downlink message. In 1003, the mobile station accesses the table 900 and determines its transport block size using its RB assignment and the MCS index. FIG. 11 summarizes the procedure for generation of the MCS table 900 as described above. In 1101, a reference subframe configuration is determined and in 1103 TBSs are generated for various numbers of resource block allocations. The TBS sizes are selected in 1103 to reduce or eliminate the need for filler bits. In 1105, the TBSs are assigned per RB allocation in the table. Duplicate TBSs are detected in 1107 and from 1109, this process is completed for each set of resource block allocations until the table is completed.

FIG. 12 illustrates an alternative embodiment using a second table 1200 for modulation order and TBS Index determination. The MCS Index 1201 may be used to retrieve a modulation order 1203 and a TBS index 1205. The MCS table 900 may then be accessed using the TBS index 1205 in some embodiments.

Since the MCS+RB allocation gives the TBS, for subframe transmit time interval (TTI) bundling, i.e., a multi-subframe assignment (e.g. 4 subframes or TTIs for transmission of a single transport block), the RB allocation for computing the TBS may be interpreted as either a per-subframe number of RBs or per-bundle number of RBs, etc. Thus in accordance with the embodiments, the systematic TBS/MCS table with 110 columns (one per RB) available for the non-bundling case, may also be reused to find the TBS for the bundling case.

The embodiments provide three alternatives for using the MCS table 900 for the bundling case, that is, assuming nRB_subframe is the number of RBs allocated to the scheduled mobile station in one subframe of the bundle. One approach is to determine the TBS using the MCS index+number of RBs (=nRB_subframe), which may require code rates greater than one in the unbundled MCS table. A second approach, which allows code rates greater than one in a subframe of a bundle, determines the TBS using the MCS index+number of RBs (=nRB_subframe×N_bundle), where "N_bundle" is the number of subframes in a bundle). A third approach, which also allows code rates greater than one in a subframe of a bundle, determines the TBS from the non-bundling TBS/MCS table 900, using the MCS index+dummy number of RBs (for example, (nRB_subframe×offset)). The offset may be, for example, a constant=3. The TBS may then be used with the MCS index+actual number of RBs (=nRB_subframe×N_-bundle) to obtain the actual spectral efficiency.

In embodiments where MIMO transmission is utilized, or spatial multiplexing with a data stream or transport block mapped to multiple layers, e.g. 2 or more transmission layers, the single layer TBS/MCS table may be re-used. When a transport block is mapped to 10 PRB allocation with 2 layers, it is effectively mapped to 20 RBs (10 RBs in the first transmission layer, and 10 RBs in the second transmission layer). Thus, a two layer transport block (i.e. transport blocks mapped to two layers) should approximately be two times the one layer transport block (i.e. transport blocks mapped to one layer) to achieve the same target spectral efficiency. One simple way of extending the MCS/TBS table is as follows: for a given MCS index and RB allocation, first determine the one-layer TBS using the MCS/TBS table as described previously. Then, define a mapping table that maps each one-layer TBS to a two-layer TBS which is approximately twice the one-layer TBS, the two-layer TBS using the transport block sizes already defined in the one-layer TBS table. If the two layer TBS exceeds twice maximum TBS in the one-layer design, additional TBSs may be defined which still follow the TBS design principles (no filler bits, same size code blocks, adjustments for CRC parity bits, etc). An example of such a TBS mapping is shown in FIG. 13 Table 1300. In yet another approach, it is possible to determine the two-layer TBS by simply looking up the one-layer MCS/TBS table, but looking up the entry defined for twice the number of RBs. However, since the MCS/TBS table is limited to a maximum of 110 RBs (or another finite value), this alternative approach can be used to define two-layer TBSs with allocations from 1, 2 . . . 55 RBs only. Per the first approach, for example, if number of Physical RBs=10, and MCS index=2, (MCS=2, nRB=10) gives a TBS value from the one-layer TBS table, which can be used with above one-layer to two-layer TBS table to find corresponding two-layer TBS. Per the second approach, for two-layers, the number of total RBs (for all layers)=2*nPRB=20, so simply look up the one-layer TBS table (MCS=2, RB=20) to get the 2-layer TBS. It is possible to adopt the above two approaches to design a hybrid two-layer TBS definition as follows. For a PRB allocation of up to 55 RBs or approximately half the number of PRBs in the MCS/TBS table, the two-layer TBS is determined from the single layer TBS/MCS table 900 using the MCS index and two times the number of RBs allocations. For PRB allocations from 56 RBs to 110 RBs, first the one layer TBS is determined based on the MCS Index+PRB allocation and it is then mapped to a two-layer TBS by a table lookup. In this hybrid method, the one-layer to two-layer TBS table can be shortened by removing some of the unused rows of table 1300. While it is not shown explicitly, the above approach can be extended to transport blocks that are mapped to more than two layers. It is also noted that the RB scaling approach for one-layer to two-layer TBS mapping using the TBS/MCS tables can also be used for assigning TBS to shortened RBs, wherein the RBs may comprise of a smaller number of REs. For example, consider a shortened RB that contains 60 REs per PRB instead of 120 REs per PRB. In this example, for an x RB allocation of shortened PRBs, the TBS may be determined using the (0.5*x) PRB allocation and using the TBS/MCS table. Thus, the scaling appropriately matches the TBS so that the resulting MCS index closely matches the original MCS index. It is further possible that the five-bit MCS index to modulation order mapping can be made variable, for example, a function of the number of PRBs.

Therefore, methods and apparatuses have been disclosed for a mobile station or UE to determine its TBS allocation and utilized MCS. The method and apparatus includes generating a single statically defined reference MCS table consisting of transport block sizes (TBSs) computed for 29 MCSs for each of PRBs where j=1, . . . , $N_{RB}^{DL}$. Three entries of the MCS table may be reserved for implicit modulation order signaling or implicit redundancy version signaling. Each MCS entry in the table is therefore populated by a TBS and the table entries are accessed based on a 5-bit MCS index and resource allocation information (number of PRBs) signaled via a DCI element that may be contained in a scheduling message, which may be a grant or assignment message. The methods and apparatuses further provide that a 5-bit MCS field for each transport block is included in the scheduling assignment/grant message which, along with the resource allocation information (#PRBs), enables the mobile station or UE to determine the scheduled TBS.

It is to be understood that while the exemplary embodiments provided herein describe a five-bit MCS signaling, other embodiments may utilize more than five, or fewer than five, MCS bits to expand or shorten the TBS tables. Further, the various embodiments described herein may be applied to various systems such as LTE-Advanced systems, for example in carrier aggregation, where multiple transport blocks are mapped to multiple carriers. In this example, the TBS/MCS table can be applied to the aggregated carriers (combining all the RBs from the different carriers) or to each carrier separately, or to a subset of the carriers. It is also to be understood that, for such embodiments, an aggregated transport block may be defined wherein the aggregated transport block comprises one or more transport blocks (that are compatible with the one-layer and two-layer TBS design) with an additional CRC parity check on the aggregated transport block. This is similar to defining a new segmentation rule at the MAC or physical layer, such that the segments are compatible with the Rel-8 transport block sizes. Furthermore, the method and apparatuses of the embodiments herein disclosed may be used for other uplink modulation schemes such as DFT-SOFDM with non-contiguous resource allocations on the uplink or OFDMA on the uplink. In any case methods and apparatuses of the embodiments herein disclosed may by used for such aggregated transport block systems and may provide suitable TBS/MCS tables corresponding to the aggregated transport blocks. Therefore various ways of allocating and/or assigning transport block sizes may be accommodated by the methods and apparatuses of the present disclosure and would remain in accordance with the herein described embodiments.

While various embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of operating a mobile station comprising:
   receiving a time-frequency resource assignment and an index; and
   determining a transport block size (TBS) value based on said time-frequency resource assignment and said index by accessing a table stored in said mobile station,
   the table comprising a plurality of TBS values, each TBS value dependent on a corresponding number of resource blocks (RBs) based on the time-frequency resource assignment and a corresponding TBS index,
   wherein accessing the table includes using a TBS index and a number of RBs to select from the table at least one of the following TBS values

| TBS Index | 1 RB | 2 RBs | 3 RBs | 4 RBs | 5 RBs | 6 RBs | 7 RBs | 8 RBs | 9 RBs | 10 RBs |
|---|---|---|---|---|---|---|---|---|---|---|
| 0 | 16 | 32 | 56 | 88 | 120 | 152 | 176 | | | |
| 1 | 24 | 48 | | 120 | | | | | | 344 |
| 2 | 32 | 72 | 120 | | | | 296 | | 376 | 424 |
| 3 | 40 | 104 | 152 | | 272 | | 392 | 440 | 504 | 568 |
| 4 | | 120 | 200 | | | | 488 | 552 | 632 | 696 |
| 5 | 72 | 152 | | | | 504 | 600 | 680 | 776 | 872 |
| 6 | 80 | 176 | 288 | | 504 | 600 | 712 | 808 | 936 | 1032 |
| 7 | 104 | 232 | | | 584 | 712 | 840 | 968 | 1096 | 1224 |
| 8 | 120 | 248 | | 536 | 680 | 808 | 968 | 1096 | 1256 | 1384 |
| 9 | 136 | 296 | 456 | 616 | 776 | 936 | 1096 | 1256 | 1416 | 1544 |
| 10 | | 320 | | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | | 488 | 744 | 1000 | 1256 | 1544 | 1800 | 2024 | 2280 | 2536 |
| 14 | | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26. | | | | | | | | | | |

2. The method of claim 1, wherein at least some of the TBS values along with transport block cyclic redundancy check (CRC) parity bits are divided into a plurality of code blocks of substantially equal size when code block segmentation is applied.

3. The method of claim 2, wherein each code block has additional code block CRC parity bits.

4. The method of claim 1, wherein at least some of the TBS values along with transport block cyclic redundancy check (CRC) parity bits are divided into a plurality of code blocks of equal size when code block segmentation is applied.

5. The method of claim 1, wherein said table includes a modulation and coding scheme index column.

6. The method of claim 5, wherein said modulation and coding scheme index column uses a five bit index.

7. The method of claim 1, receiving the time-frequency resource assignment and the index in a scheduling message and determining said TBS index from said index.

8. The method of claim 1, wherein said index is a modulation and coding scheme (MCS) index and said table includes TBS values for 29 modulation and coding scheme indices for each number of resource blocks.

9. The method of claim 1, wherein a modulation order is determined as follows:

| Index | Modulation Order |
|---|---|
| 0 | 2 |
| 1 | 2 |
| 2 | 2 |
| 3 | 2 |
| 4 | 2 |
| 5 | 2 |
| 6 | 2 |
| 7 | 2 |
| 8 | 2 |
| 9 | 2 |
| 10 | 4 |
| 11 | 4 |
| 12 | 4 |
| 13 | 4 |
| 14 | 4 |
| 15 | 4 |
| 16 | 4 |
| 17 | 6 |
| 18 | 6 |
| 19 | 6 |
| 20 | 6 |
| 21 | 6 |
| 22 | 6 |
| 23 | 6 |
| 24 | 6 |
| 25 | 6 |
| 26 | 6 |
| 27 | 6 |
| 28 | 6 |
| 29 | 2 |
| 30 | 4 |
| 31 | 6. |

10. The method of claim 1, wherein transport blocks corresponding to at least some of said TBS values in said table comprise a plurality of code blocks, and wherein said TBS values are selected such that no filler bits are added to the beginning of each of the plurality of the code blocks.

11. A wireless communication device comprising;
a transport block determination component, operative to:
receive a time-frequency resource assignment and an index; and
determine a transport block size (TBS) value based on said time-frequency resource assignment and said index by accessing a memory of said mobile station, said memory including a plurality of TBS values, each TBS value dependent on a corresponding number of resource blocks (RBs) based on the time-frequency resource assignment and a corresponding TBS index,
wherein accessing the memory includes using a TBS index and a number of RBs to select at least one of the following TBS values:

| TBS Index | 1 RB | 2 RBs | 3 RBs | 4 RBs | 5 RBs | 6 RBs | 7 RBs | 8 RBs | 9 RBs | 10 RBs |
|---|---|---|---|---|---|---|---|---|---|---|
| 0 | 16 | 32 | 56 | 88 | 120 | 152 | 176 | | | |
| 1 | 24 | 48 | | 120 | | | | | | 344 |
| 2 | 32 | 72 | 120 | | | | 296 | | 376 | 424 |
| 3 | 40 | 104 | 152 | | 272 | | 392 | 440 | 504 | 568 |
| 4 | | 120 | 200 | | | | 488 | 552 | 632 | 696 |
| 5 | 72 | 152 | | | | 504 | 600 | 680 | 776 | 872 |
| 6 | 80 | 176 | 288 | | 504 | 600 | 712 | 808 | 936 | 1032 |
| 7 | 104 | 232 | | | 584 | 712 | 840 | 968 | 1096 | 1224 |
| 8 | 120 | 248 | | 536 | 680 | 808 | 968 | 1096 | 1256 | 1384 |
| 9 | 136 | 296 | 456 | 616 | 776 | 936 | 1096 | 1256 | 1416 | 1544 |
| 10 | | 320 | | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | | 488 | 744 | 1000 | 1256 | 1544 | 1800 | 2024 | 2280 | 2536 |
| 14 | | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26. | | | | | | | | | | |

12. The device of claim 11, wherein the memory is coupled to said transport block determination component, and said memory includes a statically defined downlink reference table including TBS values for a plurality of modulation and coding scheme indices for each of a plurality of time-frequency resource blocks.

13. The device of claim 11, wherein at least some of the TBS values along with transport block cyclic redundancy check (CRC) parity bits are divided into a plurality of code blocks of substantially equal size when code block segmentation is applied.

14. The device of claim 11, wherein at least some of the TBS values along with transport block cyclic redundancy check (CRC) parity bits are divided into a plurality of code blocks of equal size when code block segmentation is applied.

15. The device of claim 14, wherein no filler bits are added to the beginning of the plurality of code blocks during code block segmentation.

16. The device of claim 14, wherein each code block has additional CRC parity bit code blocks.

17. The device of claim 11, wherein said transport block determination component is further operative to access said memory using a five bit index and wherein said memory includes a modulation and coding scheme index column that uses said five bit index.

18. The device of claim 11, wherein said wireless communication device is operative to receive the time-frequency resource assignment and the index in a scheduling message and said transport block determination component is operative to determine said TBS index from said index.

19. The device of claim 11, wherein said transport block determination component is further operative to access said memory and said memory includes TBS values for 29 modulation and coding scheme indices for each number of resource blocks.

20. The apparatus of claim 11, wherein the transport blocks corresponding to at least some of said TBS values in said memory comprise a plurality of code blocks, and wherein said TBS values are selected such that no filler bits are added to the beginning of the each of plurality of the code blocks.

21. A base transceiver station comprising:

a transport block allocation component, operative to:

send a time-frequency resource assignment and an index to at least one mobile station wherein said index corresponds to a transport block size (TBS) index stored in a memory of said base transceiver station, said memory including a plurality of TBS values dependent on a corresponding number of resource blocks based on the time-frequency resource assignment and a corresponding TBS index, wherein said transport block allocation component is operative to access from the memory, using a TBS index and a number RBs, at least one of the following TBS values:

| TBS Index | 1RBs | 2RBs | 3RBs | 4RBs | 5RBs | 6RBs | 7RBs | 8RBs | 9RBs | 10RBs |
|---|---|---|---|---|---|---|---|---|---|---|
| 0 | 16 | 32 | 56 | 88 | 120 | 152 | 176 | | | |
| 1 | 24 | 48 | | 120 | | | | | | 344 |
| 2 | 32 | 72 | 120 | | | | 296 | | 376 | 424 |
| 3 | 40 | 104 | 152 | | 272 | | 392 | 440 | 504 | 568 |
| 4 | | 120 | 200 | | | | 488 | 552 | 632 | 696 |
| 5 | 72 | 152 | | | | 504 | 600 | 680 | 776 | 872 |
| 6 | 80 | 176 | 288 | | 504 | 600 | 712 | 808 | 936 | 1032 |
| 7 | 104 | 232 | | | 584 | 712 | 840 | 968 | 1096 | 1224 |
| 8 | 120 | 248 | | 536 | 680 | 808 | 968 | 1096 | 1256 | 1384 |
| 9 | 136 | 296 | 456 | 616 | 776 | 936 | 1096 | 1256 | 1416 | 1544 |
| 10 | | 320 | | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | | 488 | 744 | 1000 | 1256 | 1544 | 1800 | 2024 | 2280 | 2536 |
| 14 | | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26. | | | | | | | | | | |

* * * * *